United States Patent
Newberg et al.

(10) Patent No.: US 12,553,525 B2
(45) Date of Patent: Feb. 17, 2026

(54) VALVE ACTUATOR ASSEMBLY

(71) Applicants: Douglas Arthur Newberg, Cincinnati, OH (US); Alexander Richard Newberg, Cincinnati, OH (US)

(72) Inventors: Douglas Arthur Newberg, Cincinnati, OH (US); Alexander Richard Newberg, Cincinnati, OH (US)

(*) Notice: Subject to any disclaimer, the term of this patent is extended or adjusted under 35 U.S.C. 154(b) by 539 days.

(21) Appl. No.: 17/721,924

(22) Filed: Apr. 15, 2022

(65) Prior Publication Data

US 2022/0333699 A1 Oct. 20, 2022

Related U.S. Application Data

(60) Provisional application No. 63/175,612, filed on Apr. 16, 2021.

(51) Int. Cl.
*F16K 7/12* (2006.01)
*F16K 31/60* (2006.01)

(52) U.S. Cl.
CPC .............. *F16K 7/126* (2013.01); *F16K 31/60* (2013.01)

(58) Field of Classification Search
CPC . F16K 7/126; F16K 7/123; F16K 7/16; F16K 31/60; F16K 31/22; F16K 31/504; F16K 27/0236
See application file for complete search history.

(56) References Cited

U.S. PATENT DOCUMENTS

| | | | |
|---|---|---|---|
| 1,992,043 A | | 2/1935 | Saunders |
| 2,863,631 A | * | 12/1958 | Boteler .................. F16K 7/126 |
| | | | 29/213.1 |
| 3,154,286 A | | 10/1964 | McFarland, Jr. |
| 3,488,824 A | * | 1/1970 | Boteler ............... F16K 27/0236 |
| | | | 29/257 |
| 4,014,514 A | * | 3/1977 | Priese ...................... F16K 7/16 |
| | | | 251/285 |
| 4,671,490 A | * | 6/1987 | Kolenc .................. F16K 41/12 |
| | | | 251/267 |

(Continued)

OTHER PUBLICATIONS

Rodriquez, Kari; International Search Report and Written Opinion of the International Searching Authority, issued in Intl. App. No. PCT/US2023/077355; Feb. 6, 2024; 11 pages.

*Primary Examiner* — Patrick C Williams
(74) *Attorney, Agent, or Firm* — FBT Gibbons LLP

(57) ABSTRACT

An actuator assembly includes, a main body, a perimeter compressor, an actuator shaft, an actuator, and a sealing member. The perimeter compressor is slidable between a retracted position and an extended position. The actuator shaft extends through the main body and the perimeter compressor and is operably coupled with a proximal end of the actuator shaft to facilitate movement of the actuator shaft between the extended position and the retracted position. The sealing member includes an inner and outer portion. The inner portion is releasably coupled with the distal end of the actuator shaft and is configured to interface with the valve body. Sliding the perimeter compressor into the extended position facilitates sandwiching of the sealing member between the perimeter compressor and the valve body. Sliding the perimeter compressor into the retracted position facilitates releasement of the sealing member therefrom.

40 Claims, 20 Drawing Sheets

(56) References Cited

U.S. PATENT DOCUMENTS

| | | | |
|---|---|---|---|
| 5,112,027 A * | 5/1992 | Hanyu | F16K 7/16 |
| | | | 251/274 |
| 5,295,660 A | 3/1994 | Honma | |
| 5,964,446 A | 10/1999 | Walton et al. | |
| 6,092,550 A | 7/2000 | Gotch et al. | |
| 9,016,307 B2 | 4/2015 | Matalon | |
| 9,709,189 B2 | 7/2017 | Matalon et al. | |
| 2001/0025654 A1 | 10/2001 | Iritani et al. | |
| 2004/0108485 A1 | 6/2004 | Lin et al. | |
| 2012/0068102 A1 | 3/2012 | Anagnos et al. | |
| 2014/0020769 A1 * | 1/2014 | Matalon | F16K 7/126 |
| | | | 137/315.05 |
| 2015/0144822 A1 | 5/2015 | Akamoto et al. | |

* cited by examiner

VALVE ACTUATOR ASSEMBLY

REFERENCE TO RELATED APPLICATIONS

This application claims priority of U.S. provisional patent application Ser. No. 63/175,612, entitled Diaphragm Valve Assembly, filed Apr. 16, 2021 and hereby incorporates this provisional patent application by reference herein in its entirety.

TECHNICAL FIELD

The apparatus and methods described below generally relate to an actuator assembly that is associated with a valve body. The actuator assembly includes a compressor assembly that is movable between an extended position and a retracted position to facilitate removal and replacement of a sealing member (i.e., a diaphragm) while the actuator assembly remains secured to the valve body.

BACKGROUND

Conventional actuator assemblies are attached to a valve body and include a diaphragm that interfaces with the valve body to control the flow of fluid through the valve body. When the diaphragm needs to be inspected or replaced, the actuator must be removed from the valve body to access the diaphragm which can be time consuming, expensive, and potentially dangerous.

BRIEF DESCRIPTION OF THE DRAWINGS

Various embodiments will become better understood with regard to the following description, appended claims and accompanying drawings wherein:

DETAILED DESCRIPTION

Figure 1:
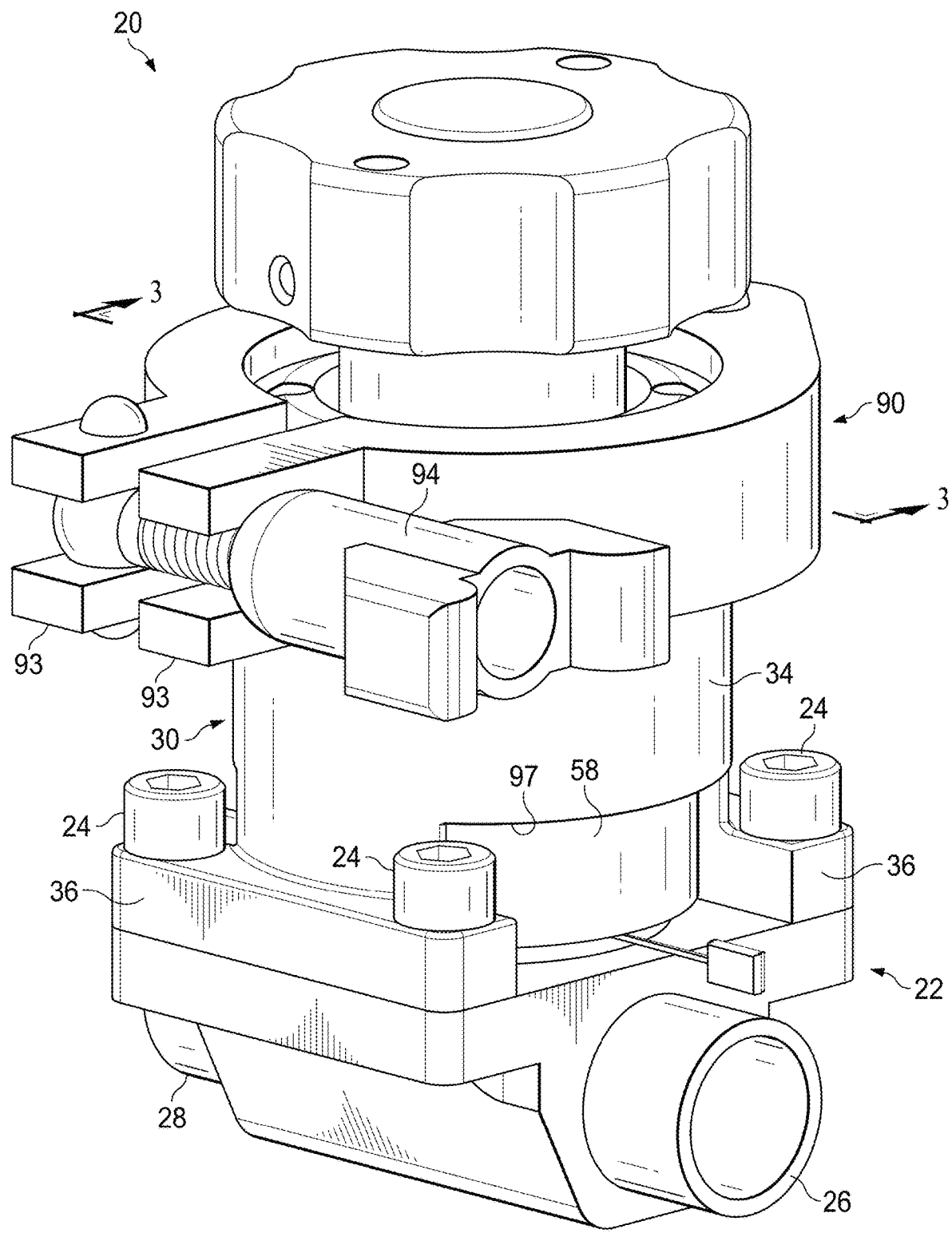
FIG. 1 is a front isometric view depicting an actuator assembly in association with a valve body, in accordance with one embodiment.
Figure 2:
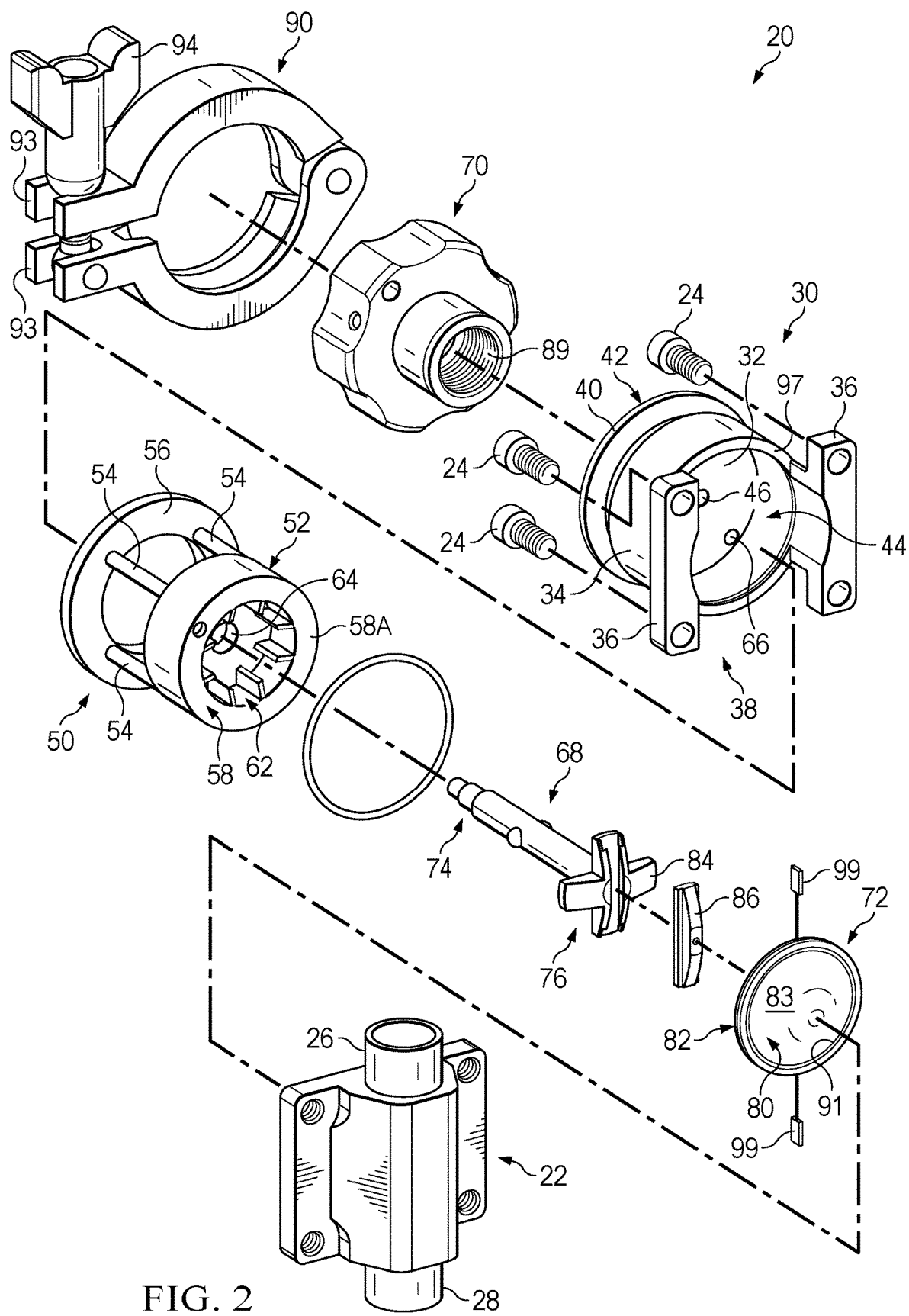
FIG. 2 is an exploded view of the actuator assembly and the valve body of FIG. 1, wherein the actuator assembly includes an actuator shaft and a compressor assembly.

Embodiments are hereinafter described in detail in connection with the views and examples of FIGS. 1-20, wherein like numbers indicate the same or corresponding elements throughout the views. FIGS. 1-2 illustrate an actuator assembly 20 that is coupled with a valve body 22 by threaded fasteners 24. The valve body 22 can include a fluid inlet 26 and a fluid outlet 28 that enables fluid to flow through the valve body 22. The actuator assembly 20 can be associated with the valve body 22 to facilitate the control of fluid through the fluid inlet 26 and the fluid outlet 28. It is to be appreciated that the valve body can have any of a variety of suitable configurations such as different body shapes to conform to different diaphragm designs, as well as different inlet and outlet arrangements to conform to different process piping and tank application needs. Any of a variety of different body designs and shapes and/or valve body porting arrangements are contemplated and can be selected to conform to a particular application and/or industry. Accordingly, the present disclosure is intended to encompass these different configurations and should not be limited to the specific examples disclosed herein.

Referring now to FIG. 2, the actuator assembly 20 can include a main body 30 that includes an upper wall 32, a side wall 34, a lower flange 36 that can extend outwardly from the side wall 34 at a lower end 38 of the main body 30, and a base collar 40 that can extend outwardly from the side wall 34 at an upper end 42 of the main body 30. The threaded fasteners 24 can extend through the lower flange 36 and can be threaded into the valve body 22 to facilitate releasable attachment of the actuator assembly 20 to the valve body 22. It is to be appreciated that any of a variety of suitable alternative attachment arrangements for coupling the actuator assembly 20 to the valve body 22 are contemplated, such as, for example, through clamping, welding, or releasable fastening. The upper wall 32 and the side wall 34 can cooperate to define an interior receptacle 44 at the lower end 38 of the main body 30. The upper wall 32 can define an opening 46 that extends to the interior receptacle 44.

Figure 3:
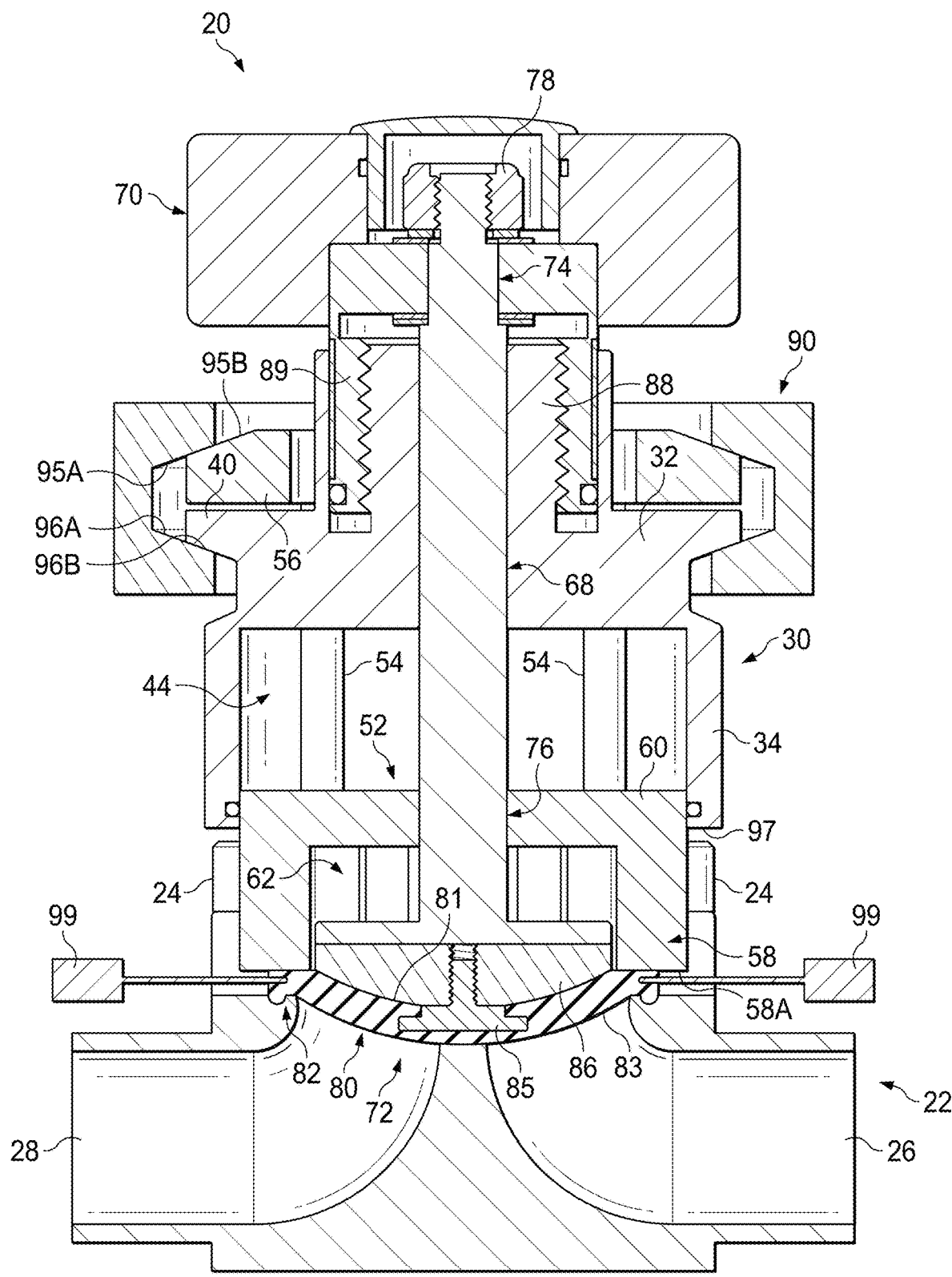
FIG. 3 is a cross sectional view taken along the line 3-3 in FIG. 1, with the actuator shaft and the compressor assembly both shown in respective extended positions.

The actuator assembly 20 is shown to include a compressor assembly 50 that includes a perimeter compressor 52, a plurality of support members 54 and an external collar 56. The plurality of support members 54 can extend between the perimeter compressor 52 and the external collar 56 and can be coupled thereto with fasteners (e.g., screws), through welding, or with any of a variety of suitable attachment arrangements. The perimeter compressor 52 can include a side wall 58 and an upper wall 60 that cooperate with each other to define a receptacle 62. The side wall 58 can include a bottom surface 58A. The upper wall 60 can define an opening 64 that extends to the receptacle 62. As illustrated in FIG. 3, the perimeter compressor 52 can be disposed in the interior receptacle 44, the external collar 56 can be external to the interior receptacle 44 and disposed above the base collar 40, and the support members 54 can extend through openings 66 (one of which is shown in FIG. 2) in the upper wall 32 of the main body 30.

Referring now to FIGS. 2 and 3, the actuator assembly 20 can include an actuator shaft 68, a handle 70, and a sealing member 72. As illustrated in FIG. 2, the actuator shaft 68 can include a proximal end 74 and a distal end 76. As illustrated in FIG. 3, the actuator shaft 68 can extend through main body 30 (via the opening 46 shown in FIG. 2) and through the perimeter compressor 52 (via the opening 64 shown in FIG. 2) such that the proximal end 74 extends above the main body 30 and the distal end 76 can be at least partially disposed in the interior receptacle 44. The handle 70 can be operably coupled with the proximal end 74 via a nut 78 (FIG. 3). The sealing member 72 can include an inner portion 80 and an outer portion 82 that extends radially from the inner portion 80. The distal end 76 of the actuator shaft 68 can include a tip portion 84 that is releasably coupled with the inner portion 80 of the sealing member 72 at an upper surface 81 to facilitate replacement of the sealing member 72. In one embodiment, the inner portion 80 of the sealing member 72 can be slidably coupled with the tip portion 84 via a stud 85 and a rail 86. The stud 85 can be embedded in the inner portion 80 of the sealing member 72 and can be threadably coupled with, or otherwise coupled to, the rail 86. The rail 86 can be slidably coupled with the tip portion 84. In such an embodiment, when the sealing member 72 is installed on the tip portion 84, as illustrated in FIG. 3, and needs to be replaced, the sealing member 72 can be removed from the tip portion 84 by sliding the sealing member 72 in a direction that slides the rail 86 out of engagement with the tip portion 84. The new sealing member can then be installed by sliding its rail into engagement with the tip portion 84. The slidable engagement between the tip portion 84 and the rail 86 can effectively provide a quick release coupling that allows the sealing member 72 to be replaced more easily and more quickly than conventional arrangements that are threaded onto a tip portion of an actuator shaft. It is to be appreciated that although the rail 86 is shown to be an elongated member that spans or otherwise extends generally laterally along the inner portion 80, any of a variety of suitable alternative configurations for the rail 86 are contemplated. It is also to be appreciated, however, that even though the tip portion 84 and the rail 86 is described as having particular advantages over conventional arrangements, any of a variety releasable coupling arrangements are contemplated and may include these conventional arrangements to facilitate releasable coupling of the sealing member 72 to the tip portion 84.

Figure 4:
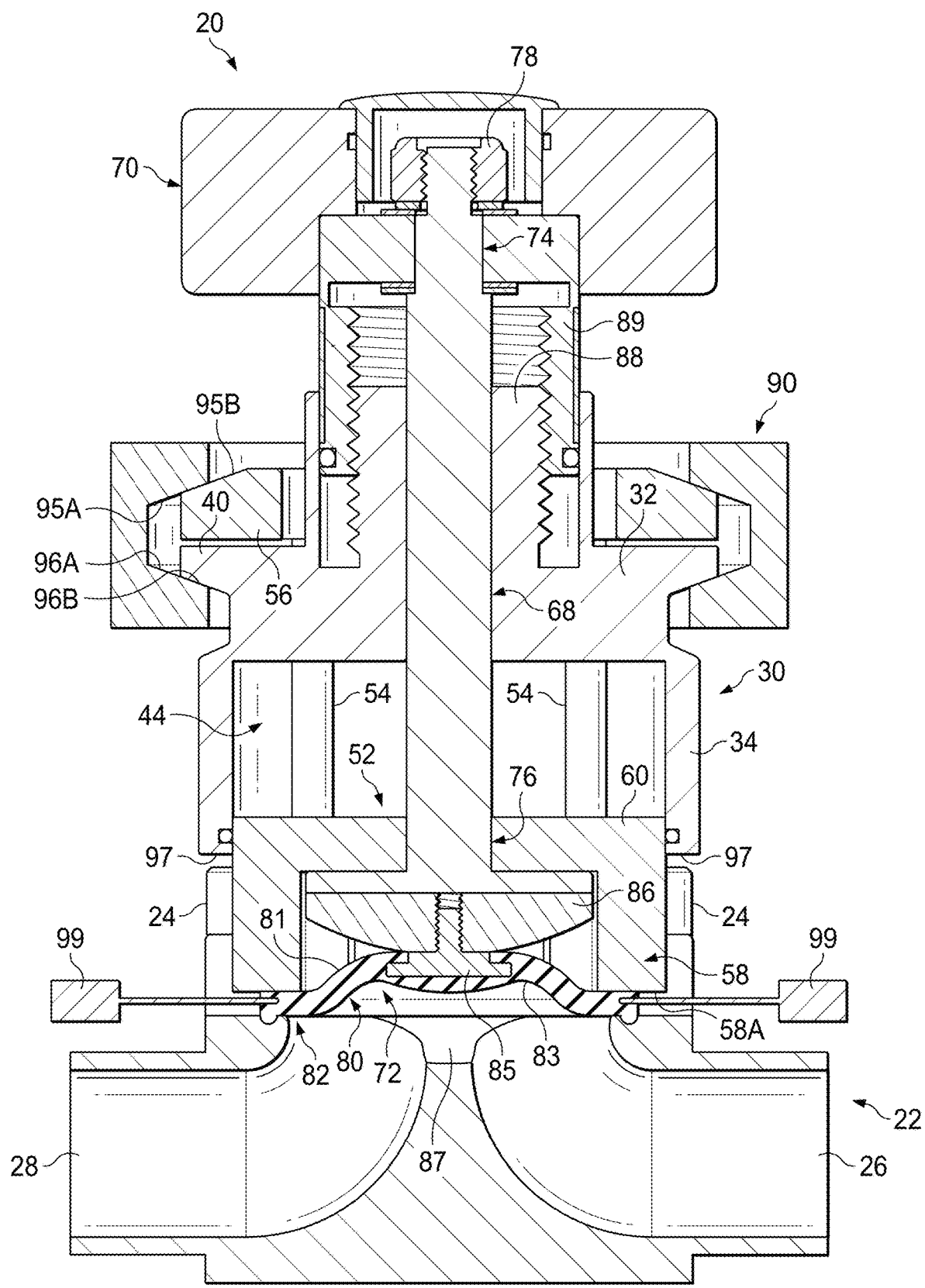
FIG. 4 is a cross sectional view of the actuator assembly and the valve body of FIG. 3, but with the actuator shaft shown in a retracted position.

As illustrated in FIG. 3, the outer portion 82 of the sealing member 72 can extend between the valve body 22 and the side wall 58 of the perimeter compressor 52 and the inner portion 80 can extend therebetween (e.g., beneath the receptacle 62) such that the bottom surface 58A of the perimeter compressor 52 and the valve body 22 contact the upper surface 81 and a lower surface 83 (FIG. 3), respectively, of the sealing member 72. Although the outer portion 82 of the sealing member 72 is shown to only extend partially between the valve body 22 and the side wall 58, the outer portion 82 might also be flush with the side wall 58 or might extend beyond the side wall and thus still considered to be extending between the valve body 22 and the side wall 58. The sealing member 72 can be formed of an elastomeric material, such as rubber, non-elastomeric material, such as metal, or some combination thereof. In one embodiment, as illustrated in FIGS. 2 and 3, the sealing member 72 can comprise a round weir diaphragm. It is to be appreciated that although the sealing member 72 is illustrated as a round weir diaphragm, other types of sealing members are contemplated for use with the actuator assembly 20 in accordance with the principles described herein, and may have any of a variety of different shapes or configurations and may be formed of different materials to conform to the requirements of a particular valve type or industry application, such as, for example, an elliptical, rectangular or square weir diaphragm, a weirless diaphragm, and a radial diaphragms (including disc and pillar) and all other forms of diaphragms. Referring now to FIGS. 3 and 4, the actuator shaft 68 can be slidable with respect to the main body 30 between an extended position (FIG. 3) and a retracted position (FIG. 4). When the actuator shaft 68 is in the extended position, as illustrated in FIG. 3, the inner portion 80 of the sealing member 72 can be flexed toward the valve body 22 such that lower surface 83 of the sealing member 72 contacts a mating surface 87 that is disposed between the fluid inlet 26 and the fluid outlet 28 in order to provide an effective seal therebetween that prevents fluid from flowing between the fluid inlet 26 and the fluid outlet 28. When the actuator shaft 68 is in the retracted position, as illustrated in FIG. 4, the inner portion 80 of the sealing member 72 can be spaced from the valve body 22 to allow fluid to flow through the valve body 22 between the fluid inlet 26 and the fluid outlet 28 and past the sealing member 72.

The handle 70 can be threadably coupled with the main body 30. The main body 30 can include a threaded stem 88 that extends from the upper wall 32 and at least partially defines the opening 46 (FIG. 2). The handle 70 can include a threaded collar 89 that is threadably engaged with the threaded stem 88 such that rotation of the handle 70 facilitates sliding of the actuator shaft 68 between the extended position (FIG. 3) and the retracted position (FIG. 4). The actuator shaft 68 can be slid into the retracted position by rotating the handle 70 in an unthreading or loosening direction (e.g., in a counter-clockwise direction) and can be slid into the extended position by rotating the handle 70 in a threading or tightening direction (e.g., in a clockwise direction). It is to be appreciated that, although the handle 70 is shown to be operably coupled with the actuator shaft 68, any of a variety of suitable alternative actuators are contemplated that can be operably coupled with the proximal end 74 of the actuator shaft 68, to facilitate movement of the actuator shaft 68 between the extended and retracted positions, such as, for example, a pneumatic actuator or an electric actuator (e.g., a solenoid).

Figure 5:
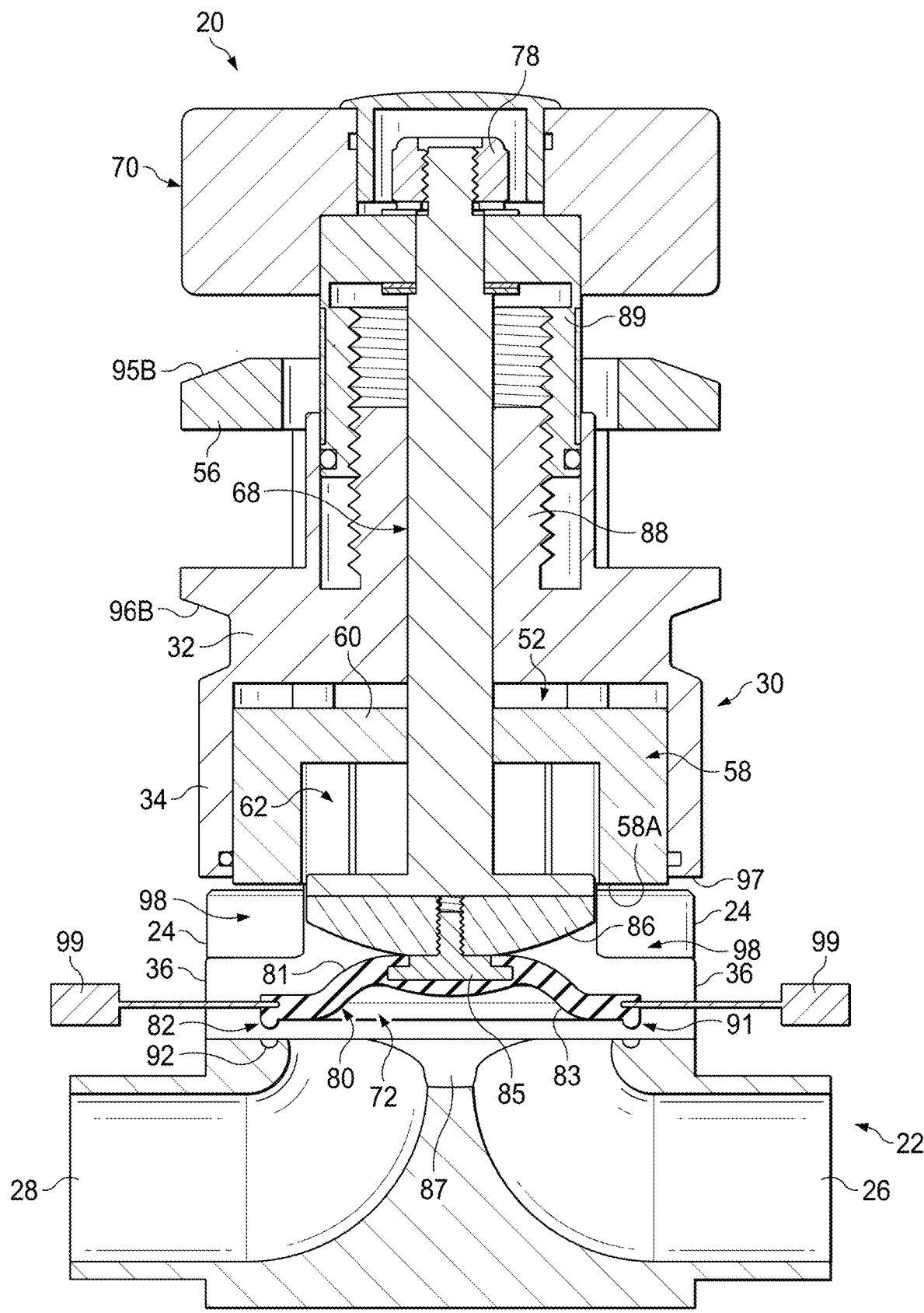
FIG. 5 is a cross sectional view of the actuator assembly and the valve body of FIG. 4, but with the compressor assembly shown in a retracted position.

Referring now to FIGS. 4 and 5, the compressor assembly 50 can be slidable with respect to the main body 30 between an extended position (FIG. 4) and a retracted position (FIG. 5). As illustrated in FIG. 4, when the compressor assembly 50 is in the extended position, the upper and lower surfaces 81, 83 can contact the bottom surface 58A of the side wall 58 and the valve body 22, respectively, at the outer portion 82 of the sealing member 72 such that the sealing member 72 is sandwiched between the perimeter compressor 52 and the valve body 22. The external collar 56 can be proximate enough to the base collar 40 to allow a clamp 90 to secure the external collar 56 and the base collar 40 together. The clamp 90 can prevent the compressor assembly 50 from being inadvertently slid into the retracted position.

When the clamp 90 is installed over the external collar 56 and the base collar 40 and is tightened, the clamp 90 can facilitate sliding of the external collar 56 and the base collar 40 together such that the perimeter compressor 52 presses the outer portion 82 of the sealing member 72 and the valve body 22 together with enough force to effectively create a seal (i.e., a perimeter seal) therebetween. The sealing member 72 can include an annular rib 91 (FIG. 5) that interfaces with an annular groove 92 (FIG. 5) on the valve body 22 in an interfacing fit to releasably secure the valve body 22 and the outer portion 82 of the sealing member 72 together. It is to be appreciated, that the valve body 22 and the sealing member 72 can additionally or alternatively include other features that interface with each other to ensure proper alignment and coupling therebetween.

The clamp 90 can include a pair of arms 93 (FIG. 2) and a wingnut 94 (FIG. 2) that interfaces with the arms 93 to adjust the clamping force imparted by the clamp 90. When the wingnut 94 is tightened, and the arms 93 of the clamp 90 can be drawn together which can cause chamfered shoulders 95A, 96A (FIG. 4) of the clamp 90 to interface with chamfered shoulders 95B, 96B (FIG. 4), respectively, of the external collar 56 and the base collar 40 to urge the external collar 56 and the base collar 40 closer to each other. Because the base collar 40 is fixed together with the side wall 34, any sliding of the external collar 56 and the base collar 40 together can translate into sliding of the side wall 58 of the perimeter compressor 52 towards the sealing member 72 and the valve body 22. The downward force (i.e., sealing force) applied to the sealing member 72 can be a function of the clamping force applied by the clamp 90 and can be adjusted with the wingnut 94 of the perimeter compressor 52 towards the valve body 22 as a function of the clamping force of the clamp 90 such that simple adjustment of the wingnut 94 can facilitate control of the sealing force between the sealing member 72 and the valve body 22. The force imparted to the sealing member 72 can accordingly be adjusted more easily and more reliably than conventional actuator assembly arrangements where adjusting the force on a sealing member can be more difficult and time-consuming to accomplish and, if not done properly, can adversely affect the alignment of the sealing member. The clamp 90 can be selectively removed from the base collar 40 and the external collar 56, as illustrated in FIG. 5, which allows the compressor assembly 50 to slide or be otherwise moved into the retracted position.

Referring now to FIG. 5, at the moment the clamp 90 is removed and the base collar 40 and the external collar 56 are released, the downward force exerted by the compressor assembly 50 onto sealing member 72 (via the perimeter compressor 52) at upper surface 81 can be relieved. The compressor assembly 50 is no longer constrained by the clamp 90 and can be free to slide into the retracted position. Releasing of the compressor assembly 50 from the base collar 40 in this manner can relieve the downward force that is imparted by the perimeter compressor 52 onto the outer portion 82 of sealing member 72 (at the upper surface 81) which can release the perimeter seal between the sealing member 72 and the valve body 22, thus releasing the sealing member 72 from being captured between the valve body 22 around its perimeter and freeing it to be removed therefrom. Once the compressor assembly 50 is slid into the retracted position, the actuator shaft 68 can be slid into the retracted position, which can facilitate retraction of the sealing member 72 (which is still attached to actuator shaft 68 at its distal end 76). The compressor assembly 50 is free to move independently of the actuator shaft 68. As such, when the actuator shaft 68 is slid to the retracted position, the corresponding upward movement of the sealing member 72 can cause the sealing member 72 to contact the perimeter compressor 52 which can pull the compressor assembly 50 into its retracted position along with the actuator shaft 68. In one embodiment, the compressor assembly 50 and the actuator shaft 68 can be simultaneously moved into the retracted position by rotating the handle 70 in an unthreading or loosening direction (e.g., in a counter-clockwise direction). It is to be appreciated that the compressor assembly 50 and the actuator shaft 68 can be moved between their respective retracted and extended positions (either independently or simultaneously) with any of a variety of suitable alternative manual or automated arrangements.

Although the compressor assembly 50 and the actuator shaft 68 are described as being slidable relative to each other, alternative embodiments are contemplated where the compressor assembly 50 and the actuator shaft 68 are mechanically linked together during retraction of the compressor assembly 50 (i.e., in order to inspect or replace sealing member 72), such that the retraction of the actuator shaft 68 would automatically retract the compressor assembly 50 together with the actuator shaft 68. A new sealing member can then be installed on the tip portion 84 and the compressor assembly 50 and the actuator shaft 68 can be returned together to their respective extended positions. Once the compressor assembly 50 and the actuator shaft 68 reach their extended positions, the mechanical linkage between the compressor assembly 50 and the actuator shaft 68 can be released to release the compressor assembly 50 from the actuator shaft 68 to allow the compressor assembly 50 to engage with the sealing member 72 to reestablish the perimeter seal with the valve body 22. The actuator shaft 68 is accordingly returned to the regular operation to facilitate control of the flow through the valve body 22.

Referring again to FIGS. 4 and 5, the side wall 34 of the main body 30 can define a pair of access windows 97 that are disposed on opposite sides of the main body 30 adjacent to the valve body 22. When the compressor assembly 50 is in the extended position, the side wall 58 of the perimeter compressor 52 can extend over the access windows 97 to prevent access to the interior receptacle 44 through the access windows 97. As illustrated in FIG. 5, when the compressor assembly 50 is in the retracted position, the side wall 58 of the perimeter compressor 52 can be slid relative to the access windows 97 and can cooperate therewith to define respective openings 98 that extend into the interior receptacle 44. It is to be appreciated that although two rectangular shaped windows are illustrated, any quantity and shape of access windows are contemplated and can be located at any desired position along the side wall 34.

Sliding of the compressor assembly 50 and the actuator shaft 68 from the extended position (FIG. 4) to the retracted position (FIG. 5) can simultaneously reveal the openings 98, release the outer portion 82 from between the perimeter compressor 52 and the valve body 22, and position the sealing member 72 relative to the access windows 97 to enable the sealing member 72 to be inspected and/or replaced through the openings 98. For example, when the compressor assembly 50 and the actuator shaft 68 are slid into the retracted position, the perimeter compressor 52 and the inner portion 80 of the sealing member 72 can be pulled far enough away from the valve body 22 to allow the outer portion 82 of the sealing member 72 to be pulled out of engagement with the valve body 22 and properly inspected. The openings 98 can be simultaneously revealed and opened far enough to allow for such inspection through the openings 98 and also to allow for removal and replacement of the sealing member 72 from the interior receptacle 44 through the openings 98, if required. In one embodiment, the actuator shaft 68 can pull the inner portion 80 far enough away from the valve body 22 that the outer portion 82 automatically disengages from the valve body 22. In another embodiment, the actuator shaft 68 can only pull the inner portion 80 of the sealing member 72 away from the valve body 22 far enough that the outer portion 82 must still be manually dislodged from the valve body 22 (e.g., with the user's finger or a tool). In such an embodiment, the access windows 97 can be opened enough to allow enough room to permit the user to contact and dislodge the outer portion 82 from the valve body 22 through the openings 98.

Figure 6:
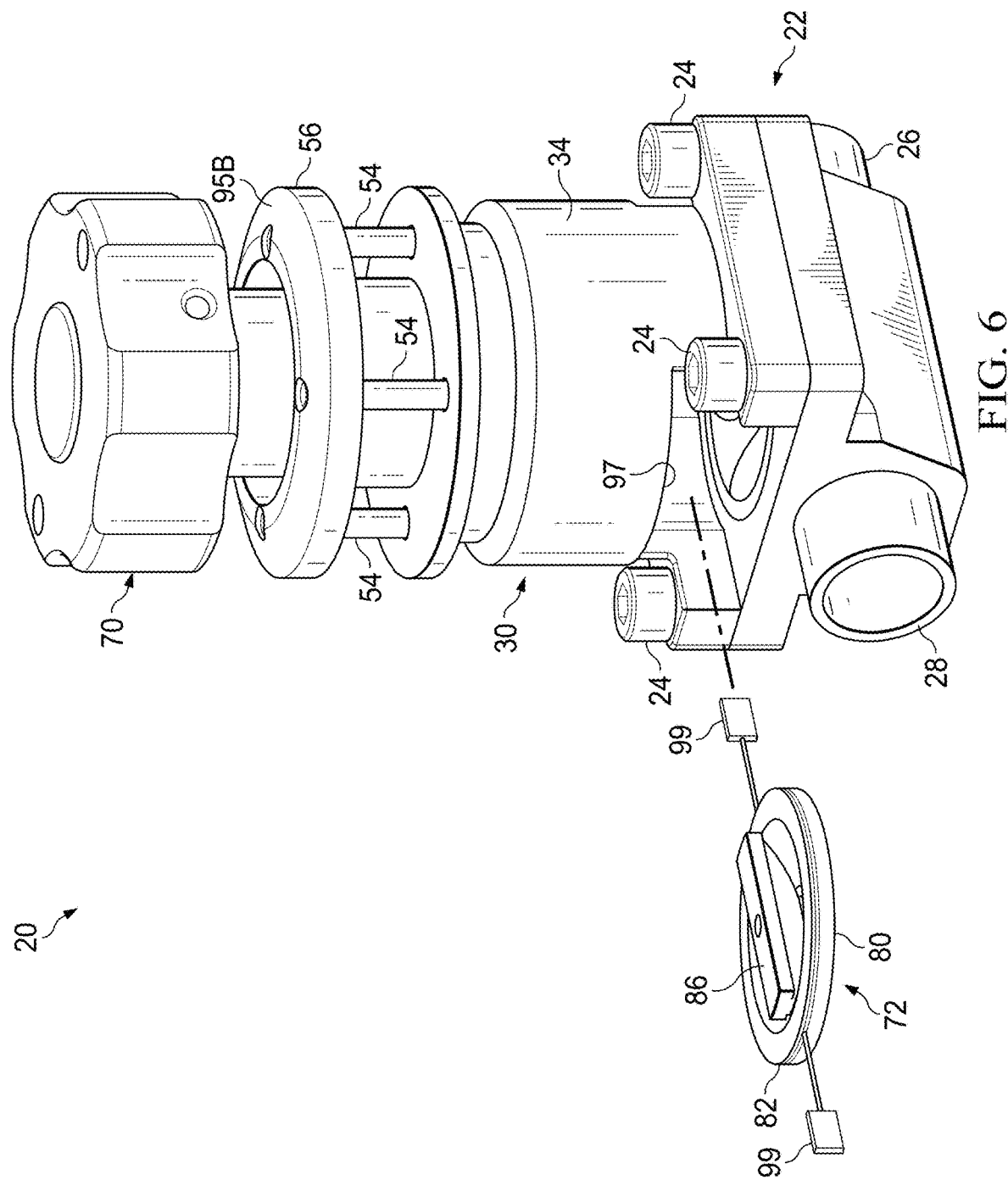
FIG. 6 is a rear isometric view the actuator assembly and the valve body of FIG. 5, but with a sealing member removed from between the compressor assembly and the valve body.

After inspection, if the sealing member 72 ultimately needs to be replaced, it can be disconnected from the tip portion 84 (by sliding in a direction that slides the rail 86 away from the tip portion 84) and pulled out of one of the openings 98, as illustrated in FIG. 6. In one embodiment, the sealing member 72 can include a tab portion 99 that extends outwardly from the outer portion 82 and can be grasped by a user to aid in the removal of the sealing member 72 from tip portion 84 and the interior receptacle 44. Once the sealing member 72 has been removed from the tip portion 84 and the interior receptacle 44, a new sealing member can then be inserted through either of the openings 98 and installed onto the tip portion 84 by sliding the new sealing member in a direction that slides its rail (e.g., 88) onto the tip portion 84. The compressor assembly 50 and the actuator shaft 68 can then be returned to their respective extended positions by rotating the handle 70 in a threading or tightening direction (e.g., in a clockwise direction).

As the compressor assembly 50 and the actuator shaft 68 return to their respective extended positions, the bottom surface 58A of the side wall 58 can contact the upper surface 81 of the sealing member 72 at the outer portion 82 which can urge the lower surface 83 of the sealing member 72 into contact with the valve body 22. The compressor assembly 50 can eventually force the annular rib 91 into the annular groove 92 on valve body 22 until a sealing engagement is created therebetween at which point the access windows 97 are closed to prevent access therethrough. The external collar 56 and the base collar 40 can then be secured together with the clamp 90 and the downward force on the new sealing member can be adjusted with the wingnut 94 to re-establish an effective perimeter seal therebetween.

It is to be appreciated that the actuator assembly 20 disclosed herein can allow for inspection and/or replacement of the sealing member 72 without requiring removal of the actuator assembly 20 from the valve body 22 as is typically the case with conventional arrangements. The ability to inspect and replace the sealing member 72 without removing the actuator assembly 20 from the valve body 22 can reduce the space, tools, labor, time and cost typically associated with conventional valve assemblies that typically require removal and re-installation of the actuator assembly to service a sealing member. In addition, since the actuator assembly 20 remains affixed to the valve body 22, the risk of injury due to mishandling of the actuator assembly during removal and installation is mitigated. The actuator assembly 20 can therefore provide a more reliable, cost effective, and less time consuming solution for replacing sealing members (e.g., diaphragms) than current conventional arrangements. Furthermore, by not requiring removal of the actuator assembly 20 to access the sealing member 72, the actuator assembly 20 can be permanently joined to or formed integrally with the valve body 22 (e.g., as a unitary one-piece design).

Figure 7:
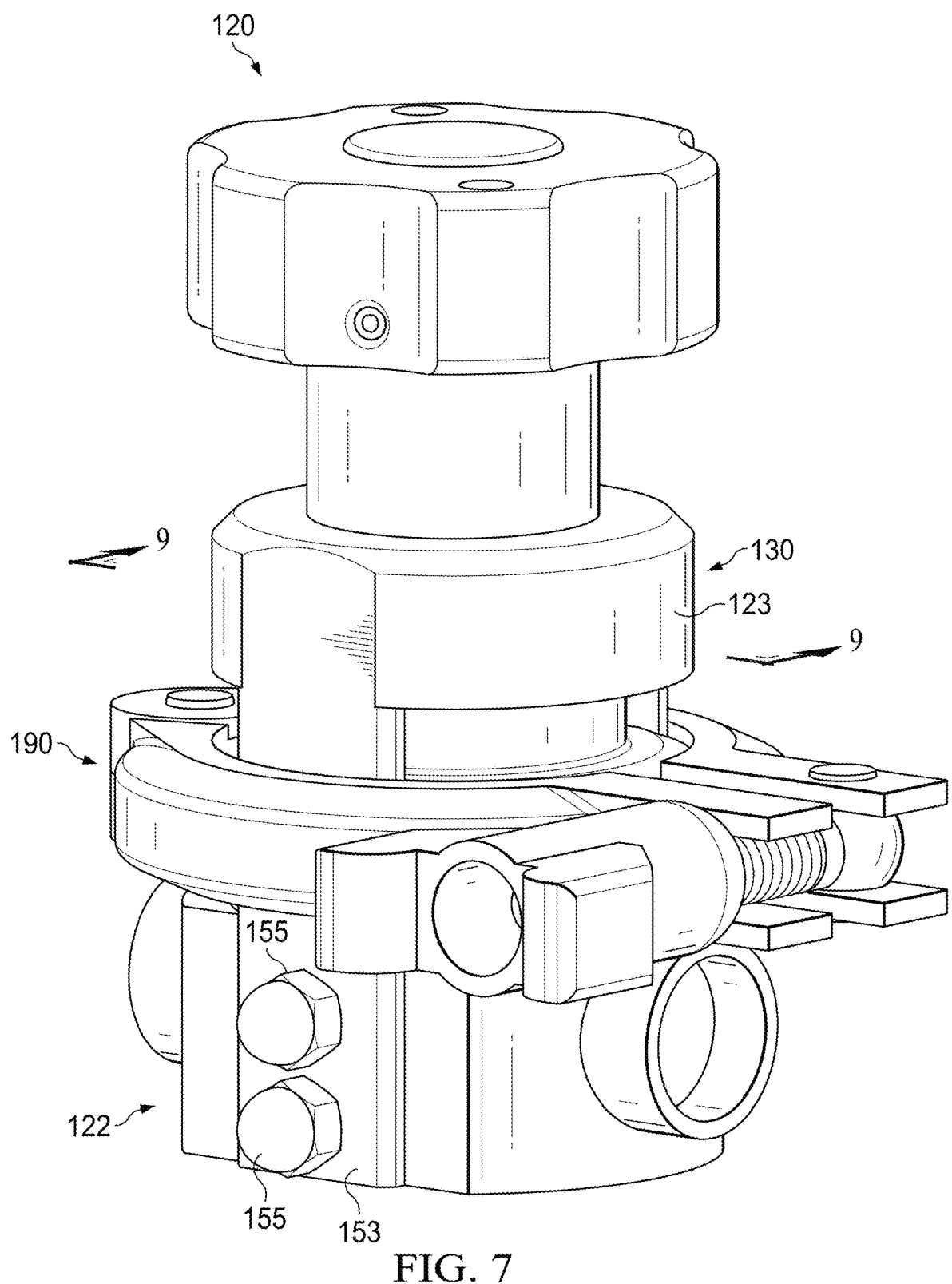
FIG. 7 is a front isometric view depicting an actuator assembly and a valve body, in accordance with another embodiment.
Figure 8:
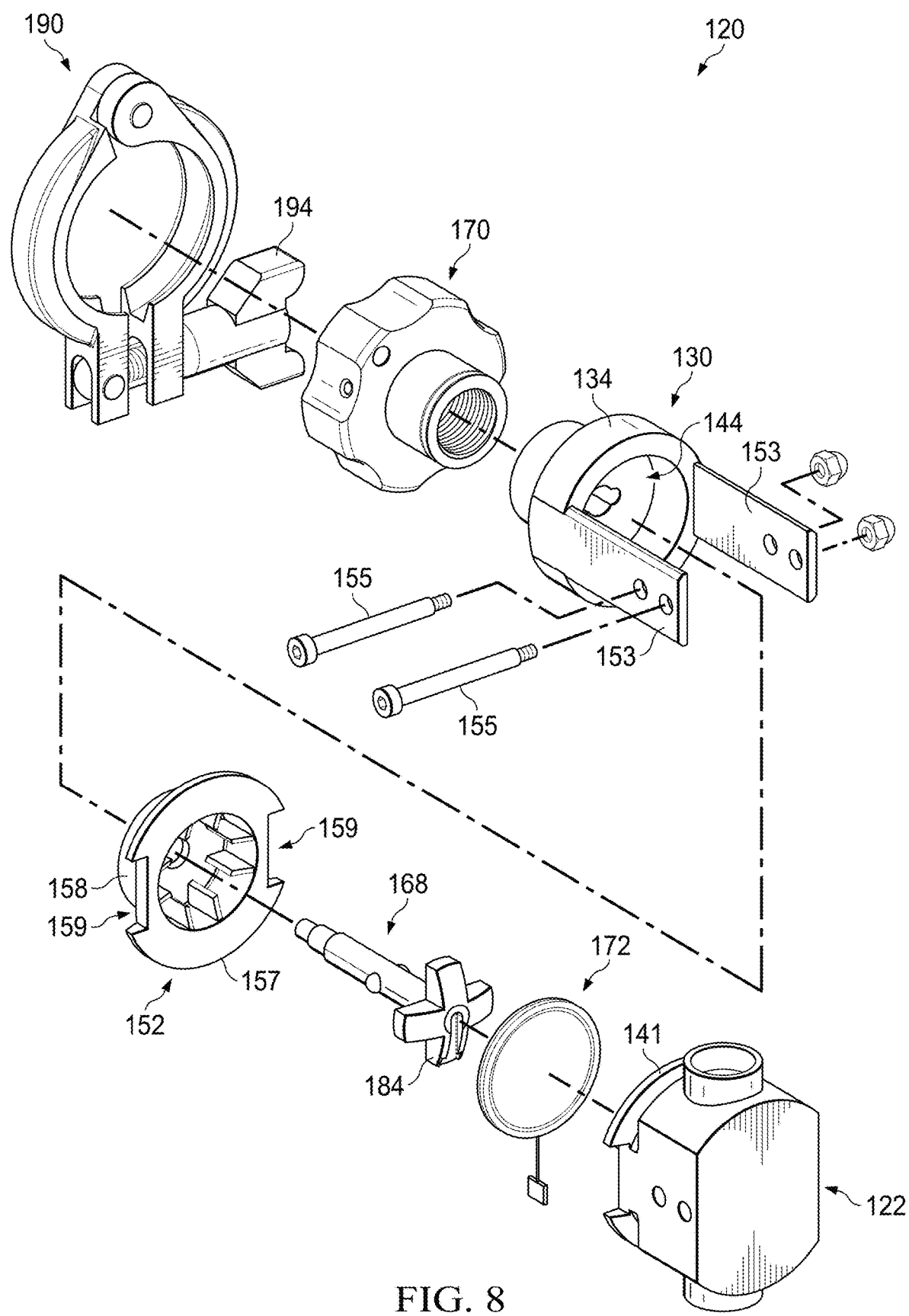
FIG. 8 is an exploded view of the actuator assembly and the valve body of FIG. 7, wherein the actuator assembly includes an actuator shaft and an perimeter compressor.
Figure 9:
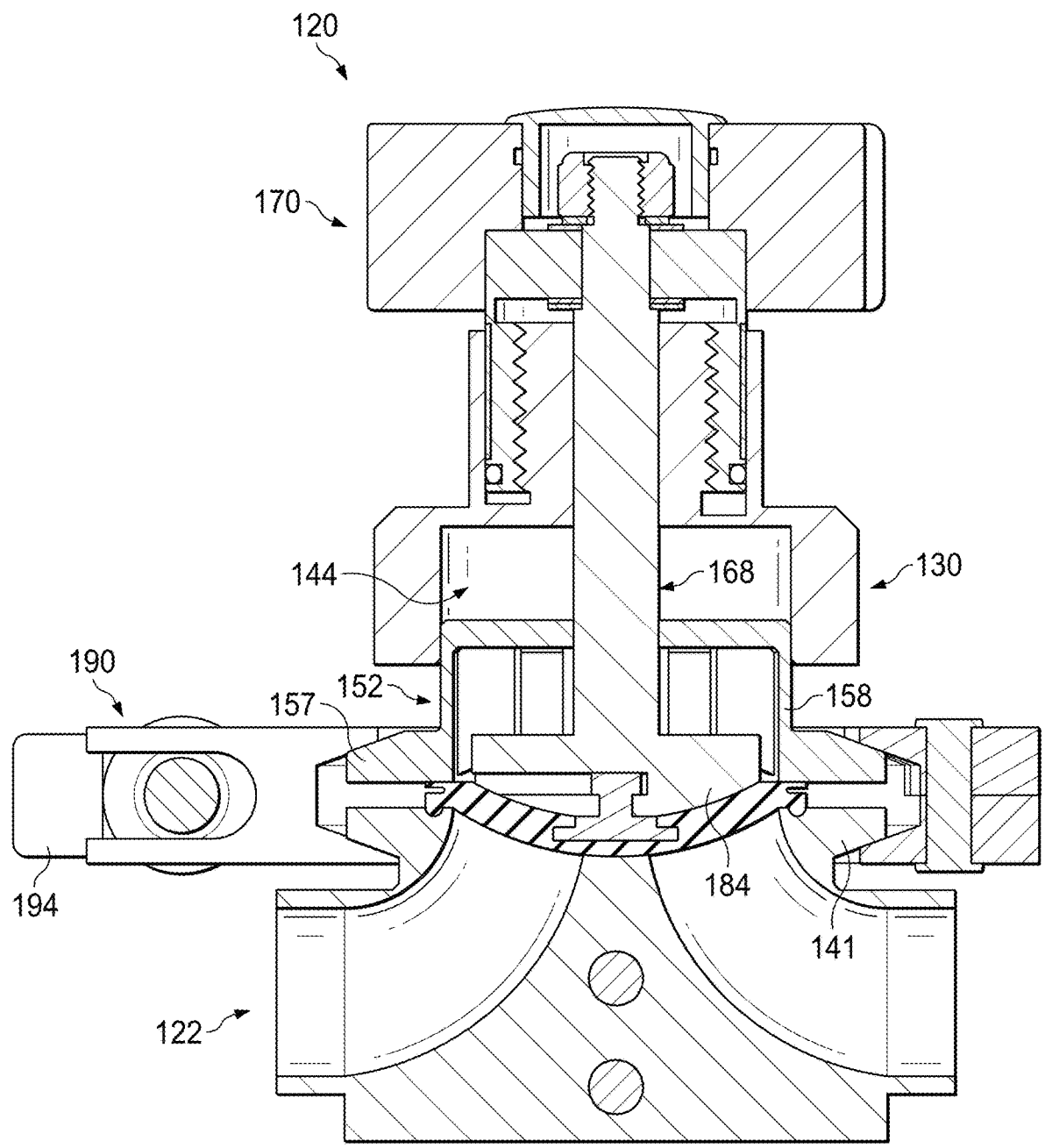
FIG. 9 is a cross sectional view taken along the line 9-9 in FIG. 7, with the actuator shaft and the perimeter compressor both shown in respective extended positions.

FIGS. 7-12 illustrate an alternative embodiment of an actuator assembly 120 that can be similar to, or the same in many respects as, the actuator assembly 20 illustrated in FIGS. 1-6. For example, as illustrated in FIGS. 7 and 8, the actuator assembly 120 can be associated with a valve body 122 and can include a main body 130, a perimeter compressor 152, a handle 170, and a clamp 190. The perimeter compressor 152 can include a side wall 158. As illustrated in FIGS. 8 and 9, the main body 130 can define an interior receptacle 144 and the perimeter compressor 152 can be at least partially disposed in the interior receptacle 144. An actuator shaft 168 can extend through each of the main body 130 and the perimeter compressor 152 and can be operably coupled with the handle 170. The actuator shaft 168 can include a tip portion 184 that is releasably coupled with sealing member 172. The actuator shaft 168 can be slidable between an extended position (FIG. 9) and a retracted position (FIG. 10) in response to rotation of the handle 170 to facilitate positioning of the sealing member 172 with respect to a mating surface 187 of the valve body 122. When the actuator shaft 168 is in the extended position, the sealing member 172 can contact the mating surface 187 to provide an effective seal therebetween that prevents fluid from flowing through the valve body 122. When the actuator shaft 168 is in the retracted position, the sealing member 172 can be spaced from the mating surface 187 to allow fluid to flow through the valve body 122.

The main body 130, however, can include a side wall 134 and a pair of support arms 153 that that extend from the side wall 134 and along the valve body 122 to facilitate coupling therebetween. The support arms 153 can support the actuator assembly 120 with respect to the valve body 122 so that the actuator assembly 120 remains attached to the valve body 122 when the clamp 190 is removed, as will be described in further detail below. In one embodiment, the support arms 153 can be releasably coupled to the valve body 122 with bolts 155.

Figure 10:
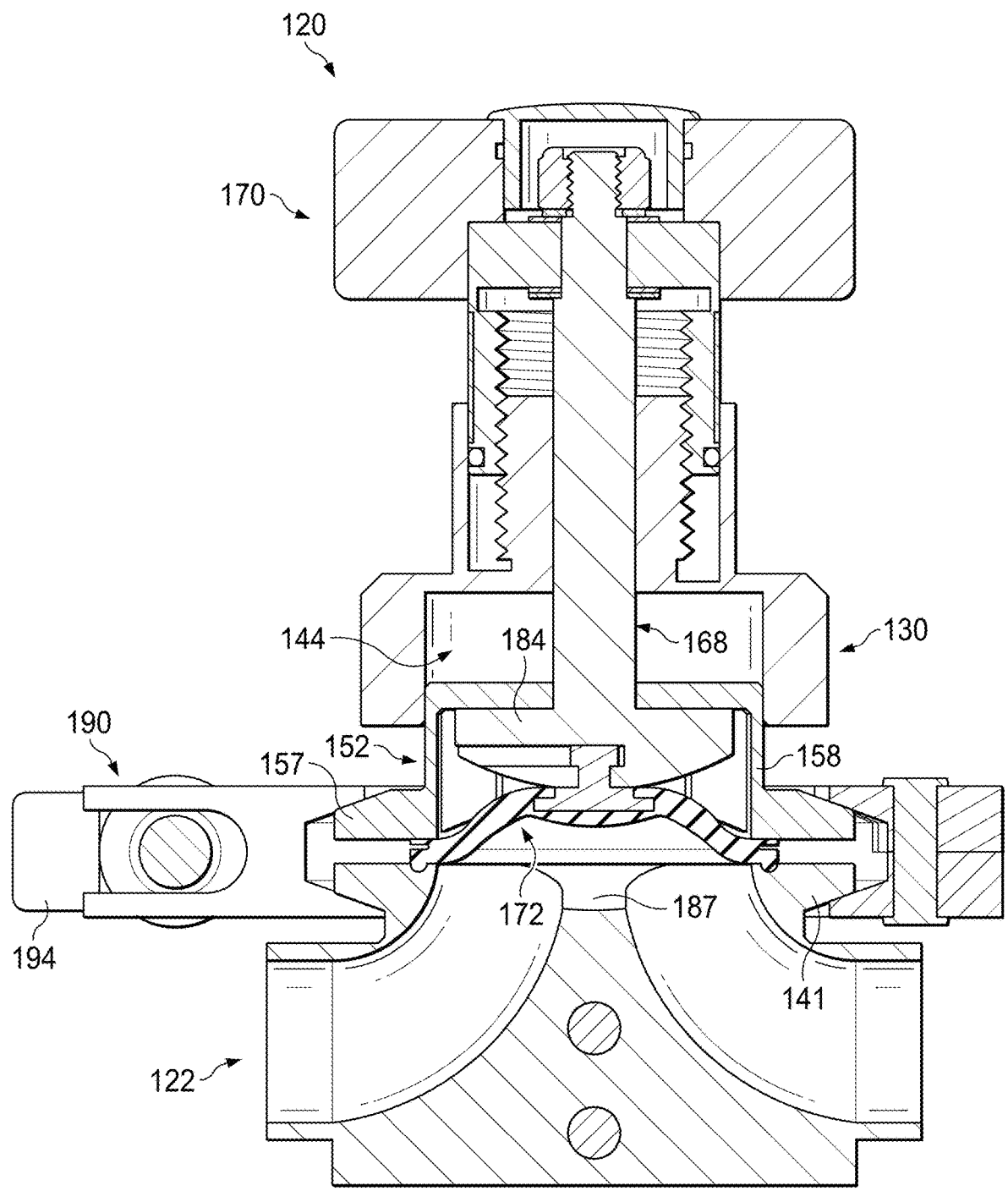
FIG. 10 is a cross sectional view of the actuator assembly and the valve body of FIG. 9, but with the actuator shaft shown in a retracted position.
Figure 11:
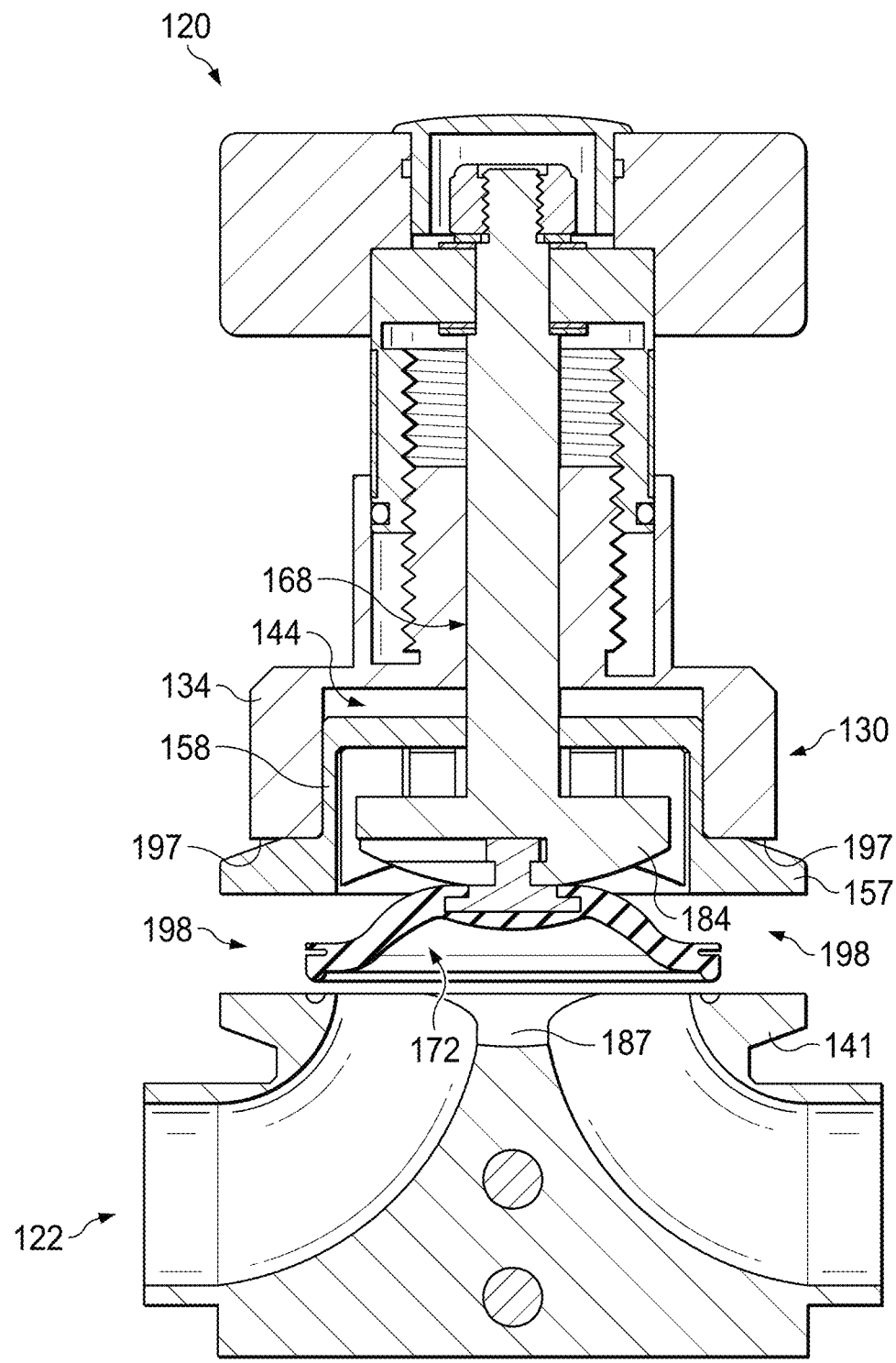
FIG. 11 is a cross sectional view of the actuator assembly and the valve body of FIG. 10, but with the perimeter compressor shown in a retracted position.

As illustrated in FIGS. 10 and 11, the perimeter compressor 152 can be slidable with respect to the main body 130 between an extended position (FIG. 10) and a retracted position (FIG. 11). As illustrated in FIG. 10, when the perimeter compressor 152 is in the extended position, the sealing member 172 can be sandwiched between the perimeter compressor 152 and the valve body 122 in a similar manner as described above with respect to the perimeter compressor 52 and the valve body 22.

The perimeter compressor 152, however, can include a compressor collar 157 that extends from the side wall 158 proximate to the valve body 122 and is rigidly fixed to the side wall 158. The compressor collar 157 can define a pair of notches 159 that accommodate the support arms 153. The valve body 122 can include a side wall 123 and a base collar 141 that that extends therefrom and is proximate to the compressor collar 157. The base collar 141 can be rigidly fixed to the side wall 123. When the perimeter compressor 152 is in the extended position, the base collar 141 can be proximate enough to the compressor collar 157 to allow the clamp 190 to secure the base collar 141 and the compressor collar 157 together. The clamp 190 can facilitate securement of the perimeter compressor 152 to the valve body 122 to prevent the perimeter compressor 152 from being inadvertently slid into the retracted position.

When the clamp 190 is installed over the base collar 141 and the compressor collar 157, the clamp 190 can be tightened to facilitate sliding of the base collar 141 and the compressor collar 157 together in a similar manner as described above with respect to the external collar 56 and the base collar 40. Since the base collar 141 is fixed to the side wall 123, the resultant sliding of the base collar 141 and the compressor collar 157 together can cause the side wall 158 of the perimeter compressor 152 to slide towards the sealing member 172 and the valve body 122. The downward force (i.e., sealing force) applied to the sealing member 172 can be a function of the clamping force applied by the clamp 190 and can be adjusted with a wingnut 194 in a similar manner as described above with respect to the clamp 190.

The clamp 190 can be removed from the base collar 141 and the compressor collar 157, as illustrated in FIG. 11. The removal of the clamp 190 from its engagement with base collar 151 and compressor collar 157 can release the perimeter compressor 152 from the valve body 122, which can, in turn, relieve the force the perimeter compressor 152 imparted to the sealing member 172 at the upper surface 181. The outer portion 182 can accordingly be disengaged from the valve body 122 such that the perimeter seal therebetween is no longer intact.

The removal of the clamp 190 in this embodiment can accordingly have a similar effect on the resulting components as the removal of the clamp 90 described above. However, the perimeter compressor 152 is not part of a compressor assembly (e.g., 50) and thus does not rely on other components (e.g., the plurality of support members 54 and the external collar 56) to facilitate sliding of the perimeter compressor 152 between the retracted and extended positions. The perimeter compressor 152 is however free to slide between its retracted and extended positions and can interact with the actuator shaft 168 and the sealing member 172 in a similar manner as described above with respect to the perimeter compressor 52, the actuator shaft 68, and the sealing member 72. For example, when the actuator shaft 168 is slid to the retracted position, the corresponding upward movement of the sealing member 172 can cause the sealing member 172 to contact the perimeter compressor 152 which can pull the perimeter compressor 152 into its retracted position along with the actuator shaft 168.

Figure 12:
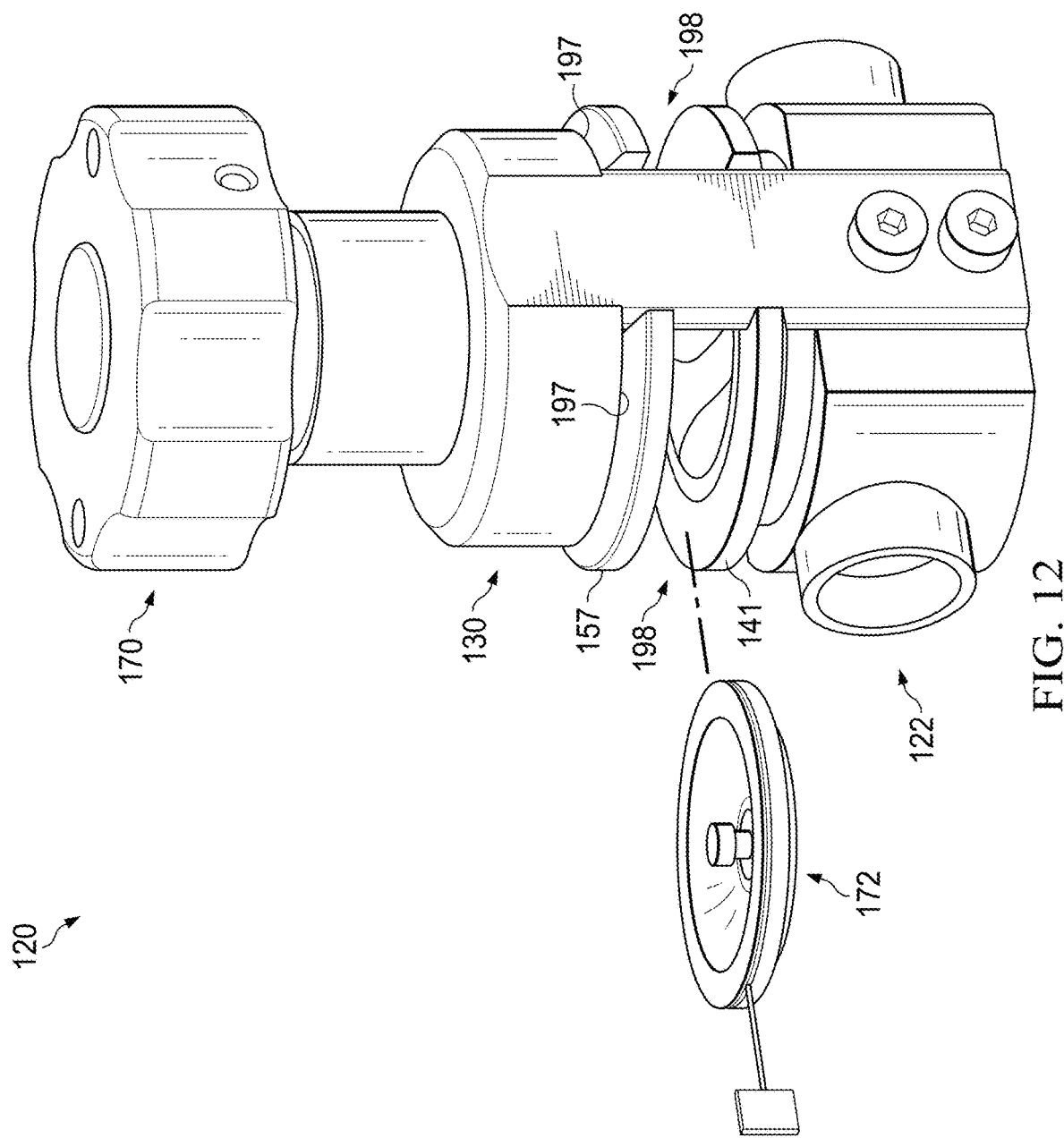
FIG. 12 is a rear isometric view the actuator assembly and the valve body of FIG. 11, but with a sealing member removed from between the perimeter compressor and the valve body.

The side wall 134 and the support arms 153 can cooperate to define a pair of access windows 197 that are disposed on opposite sides of the main body 130 adjacent to the valve body 122. When the perimeter compressor 152 is in the extended position, the side wall 158 of the perimeter compressor 152 can overlie the access windows 197 to prevent access to the interior receptacle 144 through the access windows 197, as illustrated in FIGS. 9 and 10. As illustrated in FIG. 11, when the perimeter compressor 152 is in the retracted position, the side wall 158 has been slid back to allow access to the access windows 197 and can cooperate therewith to define respective openings 198 that extend into the interior receptacle 144 and enable the sealing member 172 to be inspected and/or replaced through the openings 198, as illustrated in FIG. 12 and in a similar manner as described above with respect to the openings 98. Once the inspection/installation of the sealing member 172 is complete, the perimeter compressor 152 can be returned to the extended position and the base collar 141 and the compressor collar 157 can be secured together with the clamp 190 to reestablish the perimeter seal.

Figure 13:
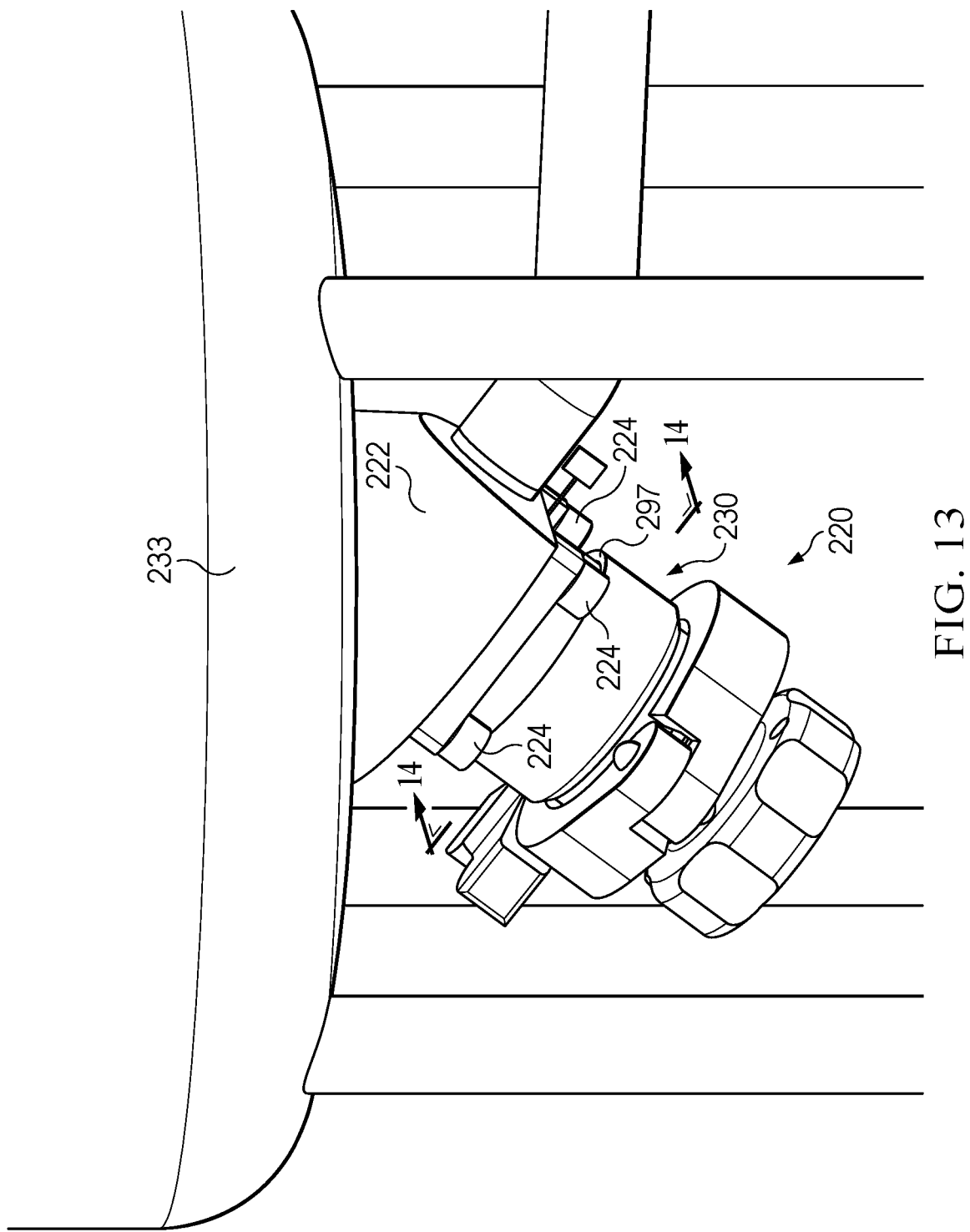
FIG. 13 is a front isometric view depicting an actuator assembly and a valve body, in accordance with yet another embodiment.
Figure 14:
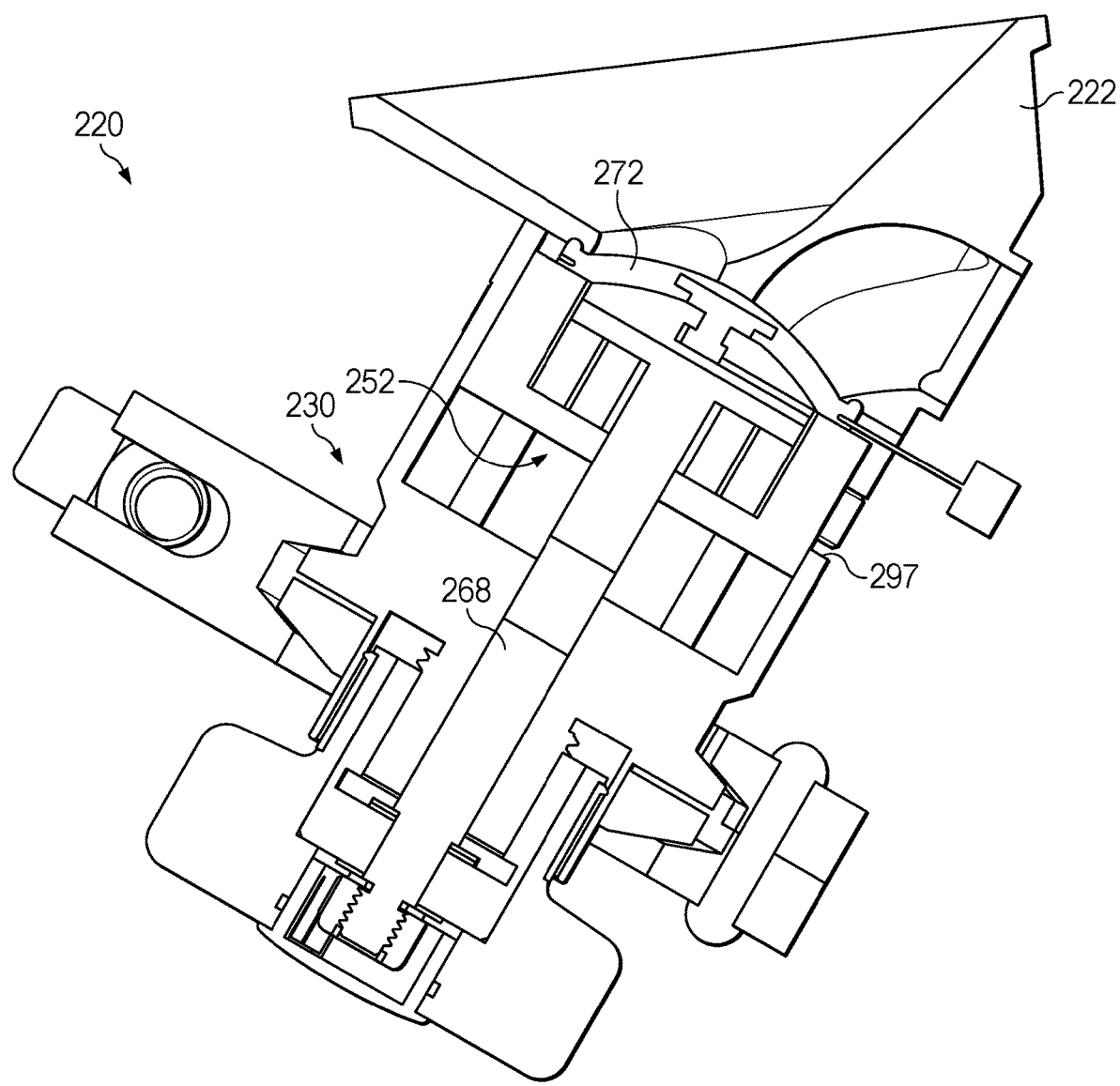
FIG. 14 is a cross sectional view taken along the line 14-14 in FIG. 13.

FIGS. 13 and 14 illustrate another alternative embodiment of an actuator assembly 220 that can be similar to, or the same in many respects as, the actuator assembly 20 illustrated in FIGS. 1-6. For example, the actuator assembly 220 can include a main body 230 and can be coupled to a valve body 222 with threaded fasteners 224. As illustrated in FIG. 14, the actuator assembly 220 can include an actuator shaft 268 and a sealing member 272 that is releasably coupled with the actuator shaft 268. The main body 230 can define an access window 297. A perimeter compressor 252 can be slidable with respect to the main body 230 between an extended position (FIG. 14) and a retracted position (not shown) to facilitate removal and replacement of the sealing member 272 through the access window 297. The valve body 222, however, can comprise a range of valve types and configurations, including a drain valve that is associated with a tank 233 (FIG. 13). The actuator shaft 268 can accordingly control the positioning the sealing member 272 relative to the valve body 222 to control the dispensation of fluid from the tank 233 through the valve body 222.

Figure 15:
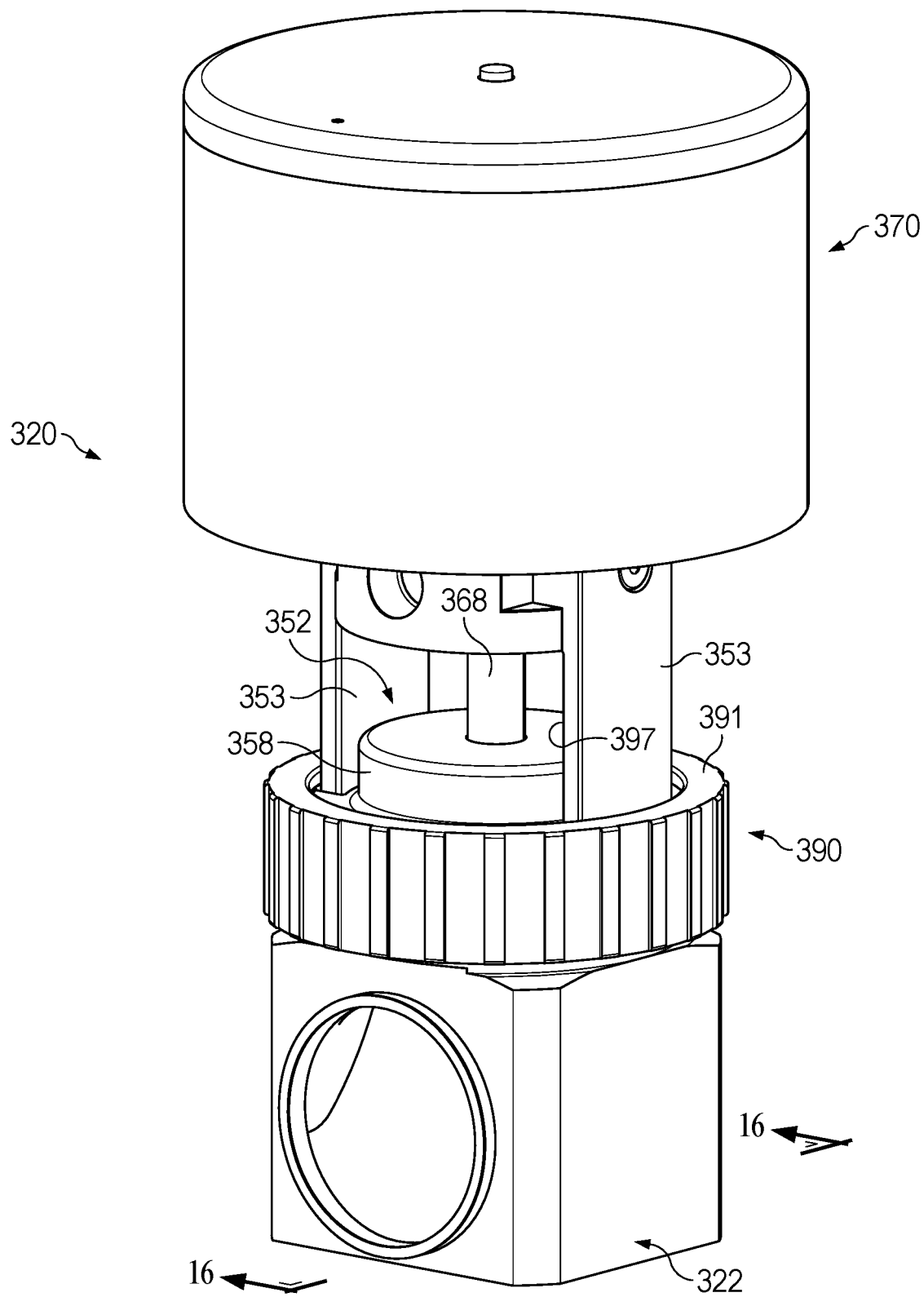
FIG. 15 is a front isometric view depicting an actuator assembly and a valve body, in accordance with yet another embodiment.
Figure 16:
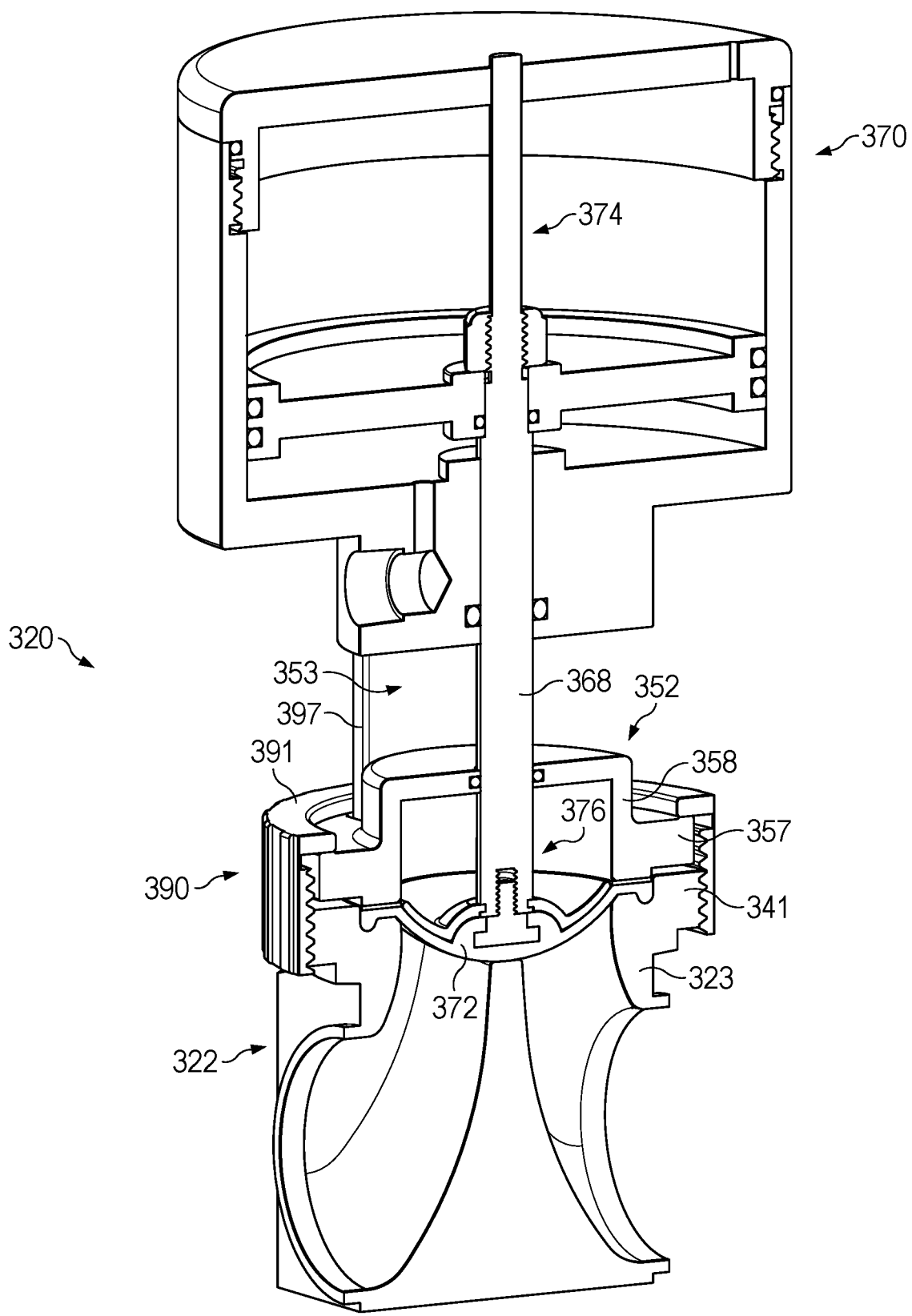
FIG. 16 is a cross sectional view taken along the line 16-16 in FIG. 15.

FIGS. 15 and 16 illustrate another alternative embodiment of an actuator assembly 320 that can be similar to, or the same in many respects as, the actuator assembly 120 illustrated in FIGS. 7-12. For example, the actuator assembly 320 can include an actuator shaft 368. As illustrated in FIG. 16, the actuator shaft 368 can include a proximal end 374 and a distal end 376. A sealing member 372 can be releasably coupled with the distal end 376 of the actuator shaft 368 to facilitate positioning of the sealing member 372 relative to the valve body 322 to control the flow of fluid therethrough.

The actuator assembly 320, however, can include a pneumatic actuator 370 that is operably coupled with the proximal end 374 of the actuator shaft 368 and facilitates pneumatic control of the actuator shaft 368 between its extended and retracted positions. The actuator assembly 320 can include a pair of support arms 353 that extend between, and are coupled to, the valve body 322 and the pneumatic actuator 370. The pneumatic actuator 370 can cooperate with the support arms 353 to define a pair of access windows 397.

A perimeter compressor 352 can be slidable with respect to the valve body 322 and the pneumatic actuator 370 between an extended position (FIG. 16) and a retracted position (not shown) to facilitate removal and replacement of the sealing member 372 through the access windows 397. As illustrated in FIG. 16, the perimeter compressor 352 can include a side wall 358 and a compressor collar 357 that extends from the side wall 358 proximate to the valve body 322. The valve body 322 can include a side wall 323 and a base collar 341 that that extends therefrom. As illustrated in FIG. 16, when the perimeter compressor 352 is in the extended position, the base collar 341 and the compressor collar 357 can be releasably secured together with a clamp ring 390 that is threadedly engaged with the base collar 341. The clamp ring 390 can include an annular ring portion 391 that engages the compressor collar 357 such that when the clamp ring 390 is tightened, the base collar 341 and the compressor collar 357 are urged towards each other. When the perimeter compressor 352 is to be moved into the extended position, the clamp ring 390 can be unthreaded from the base collar 341 to release the compressor collar 357 from the base collar 341. It is to be appreciated that, although the clamp 90 and the clamp ring 390 are illustrated herein, any of a variety of suitable alternative securement arrangements are contemplated for securing a perimeter compressor in its extended position.

Figure 17:
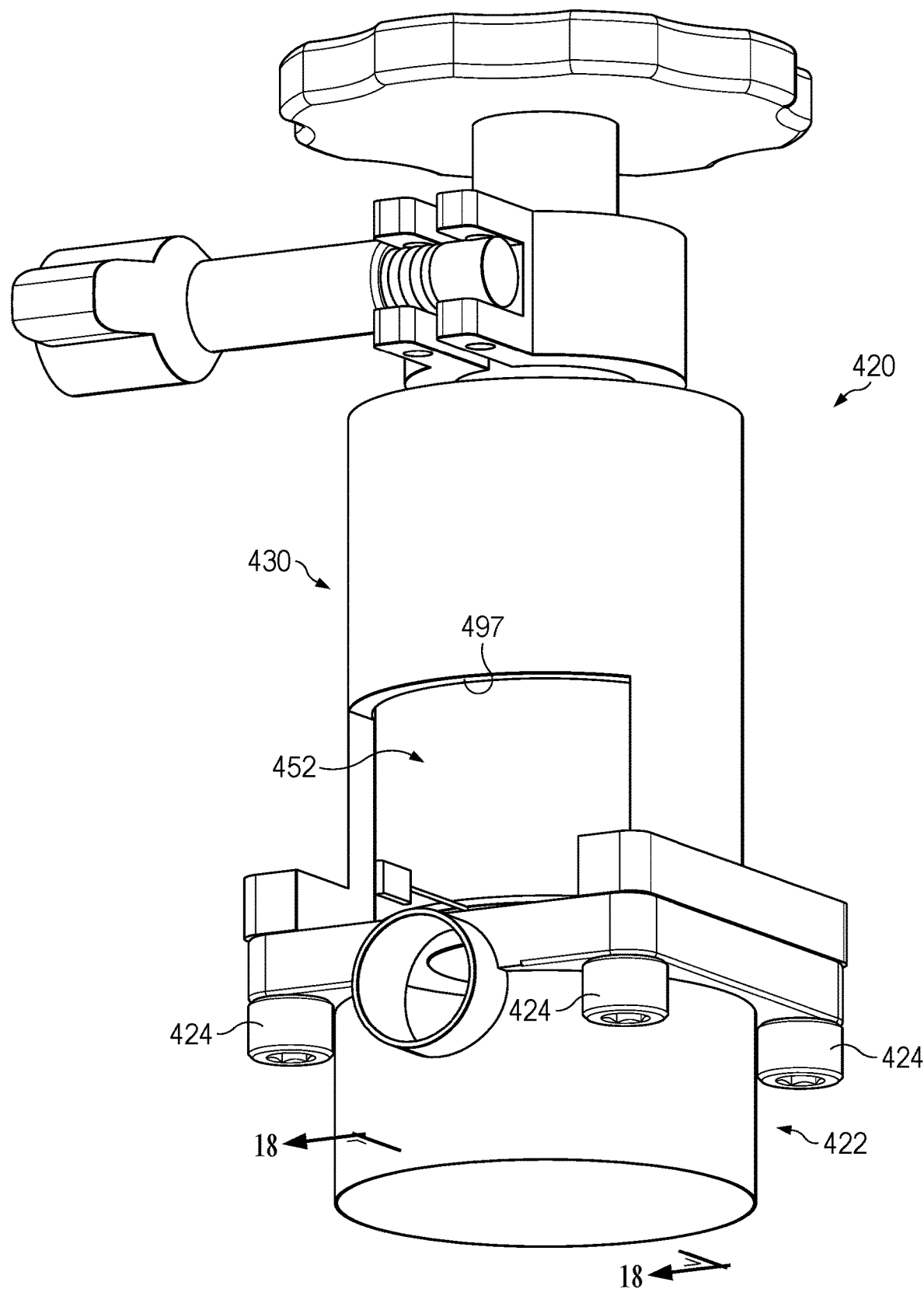
FIG. 17 is a front isometric view depicting an actuator assembly and a valve body, in accordance with still yet another embodiment.
Figure 18:
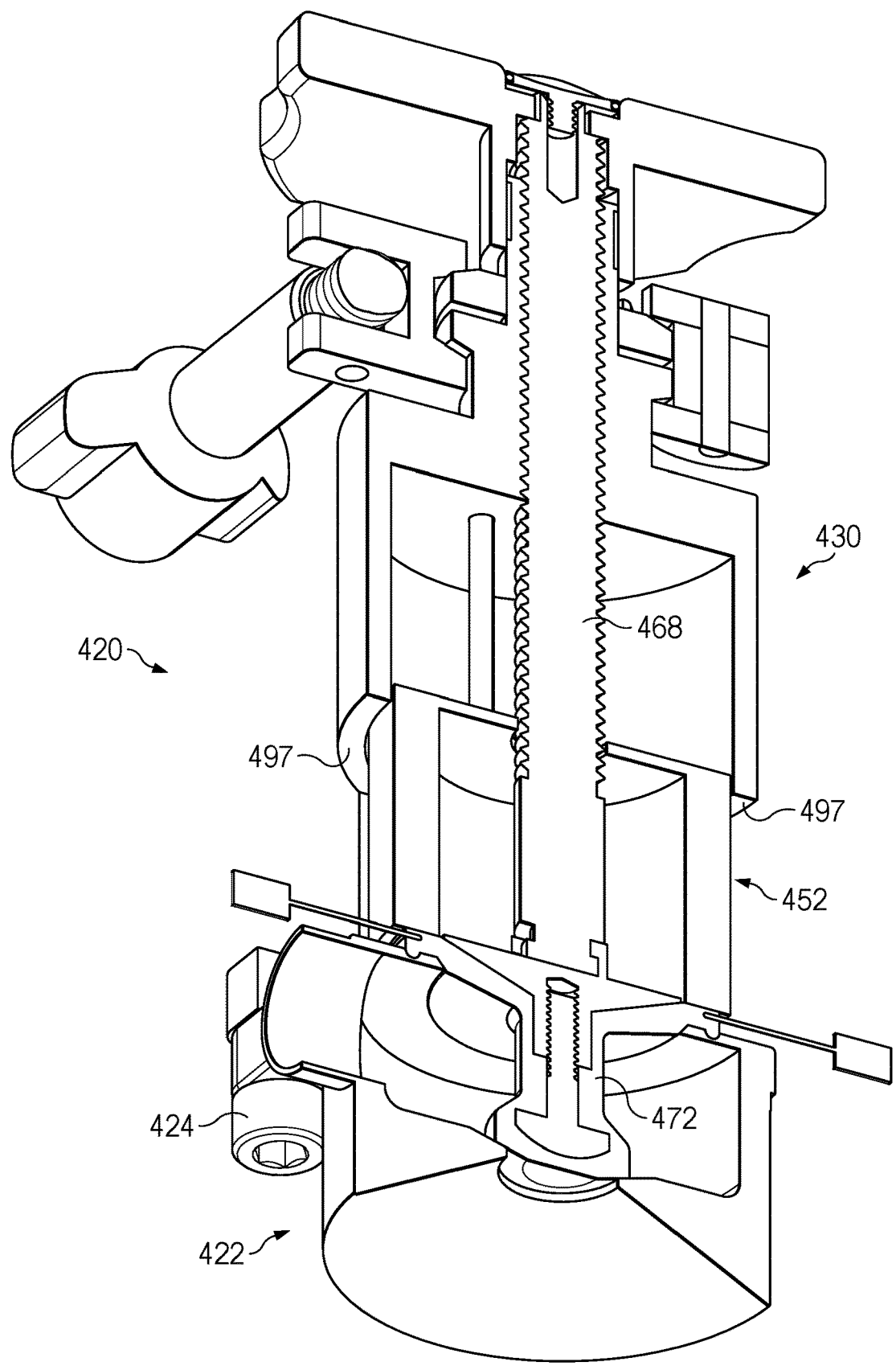
FIG. 18 is a cross sectional view taken along the line 18-18 in FIG. 17.

FIGS. 17 and 18 illustrate yet another alternative embodiment of an actuator assembly 420 that can be similar to, or the same in many respects as, the actuator assembly 20 illustrated in FIGS. 1-6. For example, the actuator assembly 420 can include a main body 430 and can be coupled to a valve body 422 with threaded fasteners 424. As illustrated in FIG. 18, the actuator assembly 420 can include an actuator shaft 468 and a sealing member 472 that is releasably coupled with the actuator shaft 468. The main body 430 can define a pair of access windows 497. A perimeter compressor 452 can be slidable with respect to the main body 430 between an extended position (FIG. 18) and a retracted position (not shown) to facilitate removal and replacement of the sealing member 472 through the access windows 497. The sealing member 472, however, can comprise a radial diaphragm valve that is taller than the sealing members (e.g., 72, 172, 272, 373) disclosed above. As such, the pair of access windows 497 can be sized to provide a larger vertical opening as compared to the access windows (e.g., 97, 197, 297, 397), in order to accommodate for the taller profile.

Figure 19:
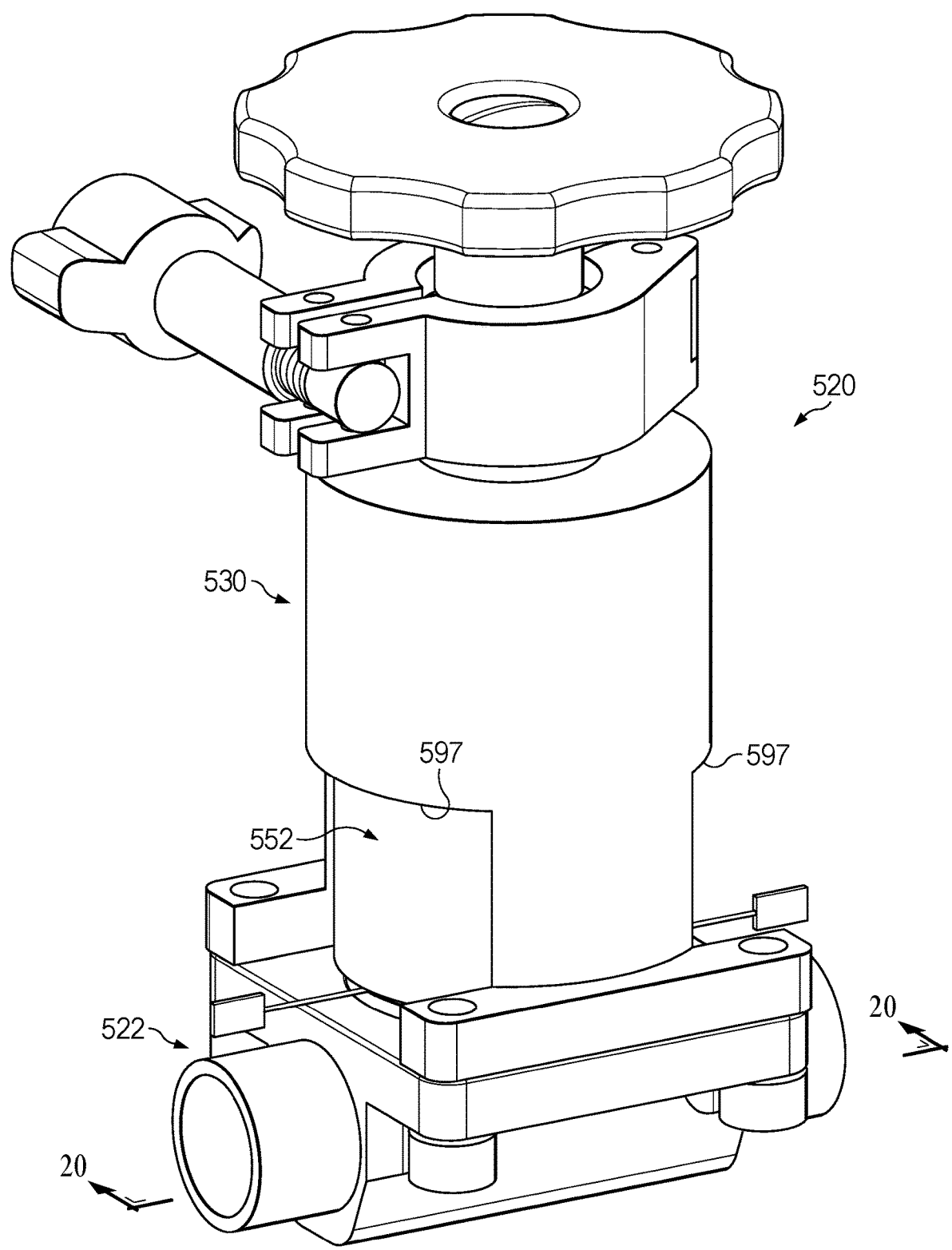
FIG. 19 is a front isometric view depicting an actuator assembly and a valve body, in accordance with still yet another embodiment.
Figure 20:
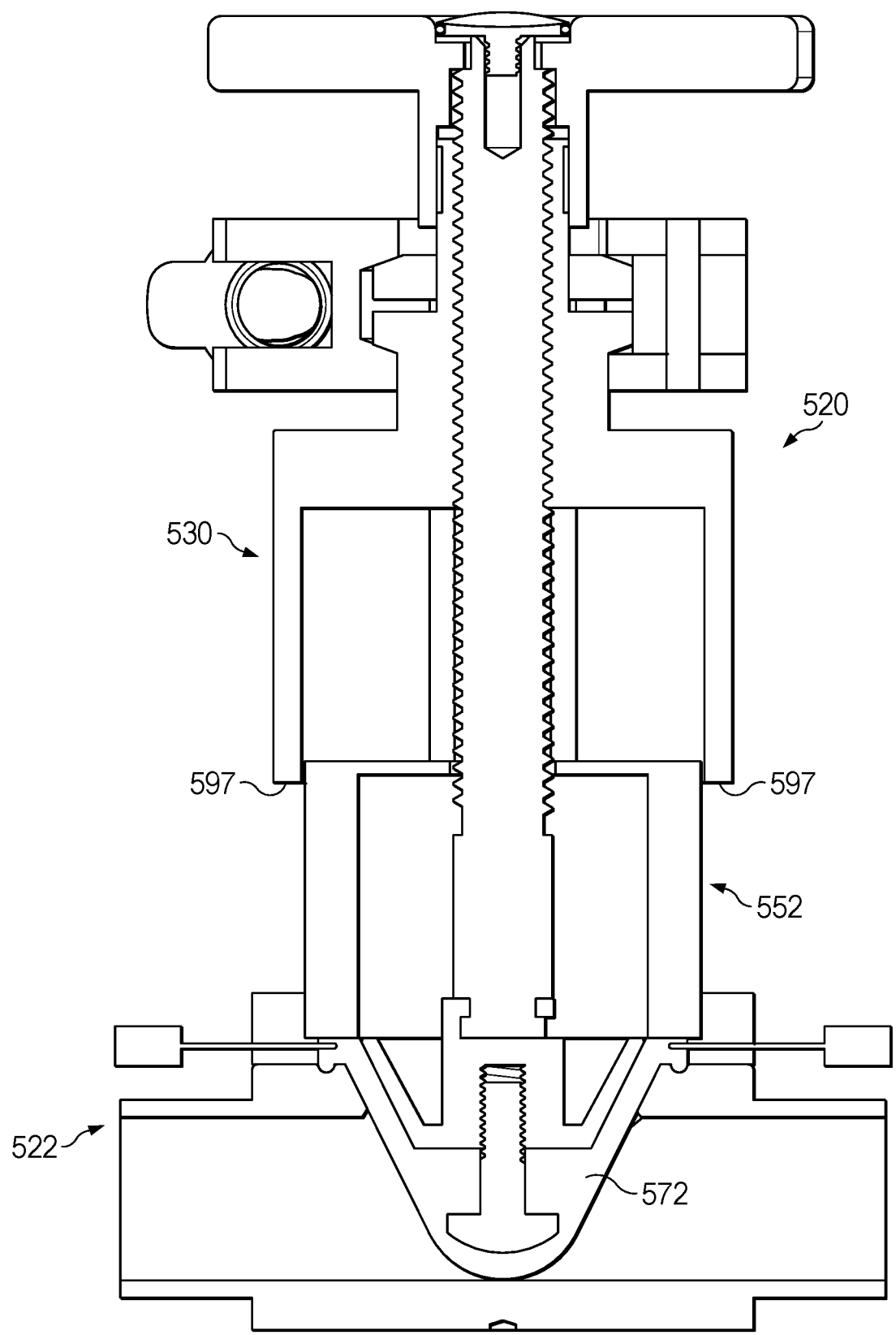
FIG. 20 is a cross sectional view taken along the line 20-20 in FIG. 19.

FIGS. 19 and 20 illustrate yet another alternative embodiment of an actuator assembly 520 that can be similar to, or the same in many respects as, the actuator assembly 420 illustrated in FIGS. 17 and 18. For example, the actuator assembly 520 can include a main body 530 and can be coupled to a valve body 522. As illustrated in FIG. 18, the main body 530 can define a pair of access windows 597. A perimeter compressor 552 can be slidable with respect to the main body 530 between an extended position (FIG. 20) and a retracted position (not shown) to facilitate removal and replacement of the sealing member 572 through the access windows 597. The sealing member 572, however, can comprise a weirless diaphragm, that has a different profile than the sealing member 472 illustrated in FIGS. 17 and 18.

The foregoing description of embodiments and examples has been presented for purposes of illustration and description. It is not intended to be exhaustive or limiting to the forms described. Numerous modifications are possible in light of the above teachings. Some other examples of the modifications that are possible are illustrated in U.S. provisional patent application Ser. No. 63/175,612, which is incorporated by reference herein in its entirety. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An actuator assembly configured for attachment to a valve body, the actuator assembly comprising:
   a main body;
   one or more support members that extend through the main body;
   a perimeter compressor disposed adjacent to the main body and slidable with respect to the main body between a retracted position and an extended position;
   a collar that is coupled with the perimeter compressor and facilitates sliding of the perimeter compressor between the retracted position and the extended position, the collar comprising an external collar that is external to the interior receptacle;
   an actuator shaft that extends through the main body and the perimeter compressor and that is slidable with respect to the main body and the perimeter compressor between an extended position and a retracted position, the actuator shaft comprising a proximal end and a distal end;
   an actuator operably coupled with the proximal end of the actuator shaft and operable to facilitate sliding of the actuator shaft between the extended position and the retracted position; and
   a sealing member comprising an inner portion and an outer portion that extends radially therefrom, the inner portion being releasably coupled with the distal end of the actuator shaft, wherein:
     sliding of the actuator between the retracted position and the extended position causes the sealing member to selectively form a fluid seal with the valve body;
     sliding of the perimeter compressor between the retracted position and the extended position causes selective formation of a perimeter seal with the valve body;
     sliding of the perimeter compressor into the retracted position facilitates releasement of downward force upon the outer portion of the sealing member;
     the perimeter compressor is disposed at least partially in the main body;
     the main body defines an interior receptacle;
     the perimeter compressor is disposed at least partially in the interior receptacle;
     the support members are coupled with the perimeter compressor and the external collar such that the external collar, the plurality of support members, and the perimeter compressor are slidable together between the retracted position and the extended position;
     the main body comprises a base collar disposed at an opposite side as the interior receptacle;
     the external collar is disposed adjacent to the base collar;
     the external collar is spaced from the base collar when in the retracted position; and
     the external collar is proximate the base collar when in the extended position to facilitate securement therebetween.

2. The actuator assembly of claim 1 further comprising a clamp that facilitates releasable securement of the external collar and the base collar together when the external collar is in the extended position.

3. A kit comprising:
   a valve body;
   an actuator assembly associated with the valve body, the actuator assembly comprising:
     a main body;
     a perimeter compressor disposed adjacent to the main body and slidable with respect to the main body between a retracted position and an extended position;

an actuator shaft that extends through the main body and the perimeter compressor and that is slidable with respect to the main body and the perimeter compressor between an extended position and a retracted position, the actuator shaft comprising a proximal end and a distal end;

an actuator operably coupled with the proximal end of the actuator shaft and operable to facilitate sliding of the actuator shaft between the extended position and the retracted position; and a sealing member comprising an inner portion and an outer portion that extends radially therefrom, the inner portion being releasably coupled with the distal end of the actuator shaft, wherein:

sliding of the actuator between the retracted position and the extended position causes the sealing member to selectively form a fluid seal with the valve body;

sliding of the perimeter compressor between the retracted position and the extended position causes selective formation of a perimeter seal with the valve body; and when the perimeter compressor is in the retracted position, the perimeter compressor is spaced from the valve body such that the perimeter compressor no longer imparts a downward force onto the sealing member.

4. The kit of claim 3 wherein:
the perimeter compressor comprises a side wall and a collar that extends from the side wall and is disposed adjacent to the valve body; and
the valve body comprises a base collar that is proximate to the collar.

5. The kit of claim 4 wherein, when the perimeter compressor is in the extended position, the base collar is proximate to the collar to facilitate securement therebetween.

6. The kit of claim 5 further comprising a clamp that facilitates releasable securement of the collar and the base collar together.

7. The kit of claim 4 wherein the main body comprises at least one support arm that is releasably coupled to the valve body.

8. The kit of claim 7 wherein the perimeter compressor defines at least one notch that accommodates the at least one support arm.

9. The kit of claim 4 wherein, when the perimeter compressor is in the retracted position, the perimeter compressor and the valve body cooperate to define an opening therebetween that extends to the interior receptacle.

10. The kit of claim 9 wherein the collar and the base collar cooperate to define the opening.

11. The kit of claim 3 wherein:
the distal end of the actuator shaft comprises a tip portion; and
the sealing member is slidably coupled with the tip portion.

12. The kit of claim 11 wherein the sealing member comprises a rail that is slidably coupled with the tip portion.

13. The kit of claim 3 wherein the perimeter compressor is disposed at least partially in the main body.

14. The kit of claim 13 wherein:
the main body defines an interior receptacle; and
the perimeter compressor is disposed at least partially in the interior receptacle.

15. The kit of claim 14 further comprising a collar that is coupled with the perimeter compressor and facilitates sliding of the perimeter compressor between the retracted position and the extended position.

16. The kit of claim 15 wherein the collar comprises an external collar that is external to the interior receptacle and the actuator assembly further comprises one or more support members that extend through the main body, wherein the support members are coupled with the perimeter compressor and the external collar such that the external collar, the plurality of support members, and the perimeter compressor are slidable together between the retracted position and the extended position.

17. The kit of claim 16 wherein:
the main body comprises a base collar disposed at an opposite side as the interior receptacle;
the external collar is disposed adjacent to the base collar;
the external collar is spaced from the base collar when in the retracted position; and
the external collar is proximate to the base collar when in the extended position to facilitate securement therebetween.

18. The kit of claim 17 further comprising a clamp that facilitates releasable securement of the external collar and the base collar together and facilitates simultaneous urging of the external collar and the base collar together and the external collar into the extended position.

19. The kit of claim 3 wherein the sealing member is not interposed between the main body and a valve body when the actuator assembly is attached to the valve body.

20. The kit of claim 19 wherein each of the perimeter compressor and the actuator shaft are slidable between their respective retracted and extended positions via at least one of a manual arrangement or an automated arrangement.

21. The kit of claim 3 wherein the outer portion of the sealing member is external of an interface between the valve body and the main body such that the sealing member is removable from the valve body and the actuator assembly while the valve body and the actuator assembly are associated together.

22. The kit of claim 3 wherein the kit is configured to provide external access to the sealing member to facilitate at least one of removal or replacement thereof.

23. The kit of claim 22 wherein the kit defines an access window for externally accessing the sealing member.

24. The kit of claim 23 wherein:
the main body defines the access window.

25. The kit of claim 24 wherein:
when in the extended position, the perimeter compressor overlies the at least one access window to prevent access to the interior receptacle through the at least one access window; and
when in the retracted position, the perimeter compressor is slid away from the at least one access window to provide access to the interior receptacle and the sealing member through the at least one access window.

26. The kit of claim 3 wherein:
the actuator assembly is either releasably attached to the valve body, permanently attached to the valve body or formed together with the valve body as a one-piece construction; and
the sealing member is accessible for removal and replacement while the actuator assembly is attached to the valve body.

27. A sealing member comprising:
an inner portion;
an outer portion that extends radially from the inner portion;

a lower surface that extends between the inner portion and the outer portion and is configured to at least partially interface with a valve body to control fluid flow therebetween;

an upper surface that extends between the inner portion and the outer portion and is spaced from the lower surface;

a rail that is coupled with the inner portion at the upper surface and extends therefrom and is configured to be releasably coupled with an actuator shaft of an actuator assembly to facilitate coupling of the sealing member thereto; and at least one tab member that extends from the outer portion for selective grasping by a user.

28. The sealing member of claim 27 wherein the rail is configured to be slidably coupled with an actuator shaft of an actuator assembly.

29. The sealing member of claim 27 wherein the rail comprises an elongated member that generally spans the inner portion.

30. An actuator assembly configured for attachment to a valve body, the actuator assembly comprising:

a main body;

a perimeter compressor disposed adjacent to the main body and slidable with respect to the main body between a retracted position and an extended position;

an actuator shaft that extends through the main body and the perimeter compressor and that is slidable with respect to the main body and the perimeter compressor between an extended position and a retracted position, the actuator shaft comprising a proximal end and a distal end;

an actuator operably coupled with the proximal end of the actuator shaft and operable to facilitate sliding of the actuator shaft between the extended position and the retracted position; and a sealing member comprising an inner portion and an outer portion that extends radially therefrom, the inner portion being releasably coupled with the distal end of the actuator shaft, wherein the sealing member is accessible through the main body to facilitate removal thereof while the actuator assembly is attached to the valve body.

31. The actuator assembly of claim 30 wherein:
the main body defines at least one access window.

32. The actuator assembly of claim 31 wherein:
when in the extended position, the perimeter compressor overlies the at least one access window to prevent access to the sealing member through the at least one access window; and when in the retracted position, the perimeter compressor is slid away from the at least one access window to provide access to the sealing member through the at least one access window.

33. The actuator assembly of claim 30 wherein the sealing member comprises a round diaphragm.

34. The actuator assembly of claim 30 wherein the actuator comprises a handle that is threadably coupled with the main body such that rotation of the handle facilitates sliding of the actuator shaft between the extended position and the retracted position.

35. The actuator assembly of claim 30 wherein:
the distal end of the actuator shaft comprises a tip portion; and the sealing member is slidably coupled with the tip portion.

36. The actuator assembly of claim 35 wherein the sealing member comprises a rail that is slidably coupled with the tip portion.

37. The actuator assembly of claim 30 wherein the sealing member is configured such that it is not interposed between the main body and a valve body at a point of attachment of the actuator assembly to the main body when the actuator assembly is attached to the valve body.

38. The actuator assembly of claim 37 wherein each of the perimeter compressor and the actuator shaft are slidable between their respective retracted and extended positions via at least one of a manual arrangement or an automated arrangement.

39. The actuator assembly of claim 30 wherein the perimeter compressor is disposed at least partially in the main body.

40. The actuator assembly of claim 30 wherein the actuator shaft and the perimeter compressor are slidable independently relative to one another between their respective extended and retracted positions.

* * * * *